United States Patent
Sainton et al.

(10) Patent No.: US 7,386,322 B2
(45) Date of Patent: *Jun. 10, 2008

(54) ADAPTIVE OMNI-MODAL RADIO APPARATUS AND METHODS

(75) Inventors: Joseph B. Sainton, Newberg, OR (US); Charles M. Leedom, Jr., Falls Church, VA (US); Eric J. Robinson, Ashburn, VA (US)

(73) Assignee: MLR, LLC, Palm Beach Garden, FL (US)

( * ) Notice: Subject to any disclaimer, the term of this patent is extended or adjusted under 35 U.S.C. 154(b) by 448 days.

This patent is subject to a terminal disclaimer.

(21) Appl. No.: 11/047,665

(22) Filed: Feb. 2, 2005

(65) Prior Publication Data

US 2005/0159179 A1 Jul. 21, 2005

Related U.S. Application Data

(60) Division of application No. 09/670,696, filed on Sep. 28, 2000, now Pat. No. 6,934,558, which is a division of application No. 09/149,292, filed on Sep. 9, 1998, now Pat. No. 6,134,453, which is a division of application No. 08/707,262, filed on Sep. 4, 1996, now Pat. No. 5,854,985, which is a continuation of application No. 08/167,003, filed on Dec. 15, 1993, now abandoned.

(51) Int. Cl.
*H04M 1/00* (2006.01)
*H04Q 7/20* (2006.01)

(52) U.S. Cl. .................. 455/552.1; 455/550.1; 455/435.2

(58) Field of Classification Search ............. 455/552.1, 455/432.1, 422.1, 435.1, 435.2, 456.1, 456.3, 455/550.1, 73, 517, 403, 70, 566, 90.3, 435.3; 370/310, 328, 329, 341
See application file for complete search history.

(56) References Cited

U.S. PATENT DOCUMENTS

| 4,144,496 A | 3/1979 | Cunningham et al. |
| 4,371,751 A | 2/1983 | Hilligoss, Jr. et al. |
| 4,558,453 A | 12/1985 | Mimken |
| 4,578,796 A | 3/1986 | Charalambous et al. |
| 4,654,879 A | 3/1987 | Goldman et al. |
| 4,741,049 A | 4/1988 | De Jager et al. |

(Continued)

FOREIGN PATENT DOCUMENTS

EP 0268375 5/1988

(Continued)

OTHER PUBLICATIONS

Castro, "Handoff Techniques in Universal Mobile Communications", ICUPC '93 Conference Record, Aug. 1993, pp. 844-848.

(Continued)

*Primary Examiner*—Sonny Trinh
(74) *Attorney, Agent, or Firm*—Rothwell, Figg, Ernst & Manbeck

(57) ABSTRACT

The present invention provides, among other things, a multi-modal device for facilitating wireless communication over any one of a plurality of wireless communication networks operating pursuant to differing transmission protocols and/or over differing radio frequencies.

24 Claims, 16 Drawing Sheets

U.S. PATENT DOCUMENTS

| | | | |
|---|---|---|---|
| 4,799,253 A | 1/1989 | Stern et al. | |
| 4,811,420 A | 3/1989 | Avis et al. | |
| 4,833,727 A | 5/1989 | Calvet et al. | |
| 4,866,431 A | 9/1989 | Andros et al. | |
| 4,887,311 A | 12/1989 | Garner et al. | |
| 4,905,301 A | 2/1990 | Krolopp et al. | |
| 4,916,728 A | 4/1990 | Blair | |
| 4,977,612 A | 12/1990 | Wilson | |
| 4,985,904 A | 1/1991 | Ogawara | |
| 4,989,230 A | 1/1991 | Gillig et al. | |
| 5,008,925 A | 4/1991 | Pireh | |
| 5,020,092 A | 5/1991 | Phillips et al. | |
| 5,020,093 A | 5/1991 | Pireh | |
| 5,020,094 A | 5/1991 | Rash et al. | |
| 5,034,993 A | 7/1991 | Sasuta et al. | |
| 5,077,834 A | 12/1991 | Andros et al. | |
| 5,119,397 A | 6/1992 | Dahlin et al. | |
| 5,121,115 A | 6/1992 | Andros et al. | |
| 5,122,795 A | 6/1992 | Cubley et al. | |
| 5,127,042 A | 6/1992 | Gillig et al. | |
| 5,134,709 A | 7/1992 | Bi et al. | |
| 5,159,625 A * | 10/1992 | Zicker | 455/432.1 |
| 5,175,867 A | 12/1992 | Wejke et al. | |
| 5,179,360 A | 1/1993 | Suzuki | |
| 5,200,991 A | 4/1993 | Motoyanagi | |
| 5,201,067 A | 4/1993 | Grube et al. | |
| 5,210,785 A | 5/1993 | Sato et al. | |
| 5,239,701 A | 8/1993 | Ishii | |
| 5,249,302 A * | 9/1993 | Metroka et al. | 455/552.1 |
| 5,260,988 A | 11/1993 | Schellinger et al. | |
| 5,261,117 A | 11/1993 | Olson | |
| 5,276,907 A | 1/1994 | Meidan | |
| 5,293,628 A | 3/1994 | Langan et al. | |
| 5,297,191 A | 3/1994 | Gerszberg | |
| 5,301,359 A | 4/1994 | Van den Heuvel et al. | |
| 5,309,503 A | 5/1994 | Bruckert et al. | |
| 5,327,486 A | 7/1994 | Wolff et al. | |
| 5,343,513 A | 8/1994 | Kay et al. | |
| 5,353,331 A | 10/1994 | Emery et al. | |
| 5,365,571 A | 11/1994 | Rha et al. | |
| 5,371,780 A | 12/1994 | Amitay | |
| 5,442,806 A * | 8/1995 | Barber et al. | 455/435.2 |
| 5,475,735 A | 12/1995 | Williams et al. | |
| 5,491,723 A | 2/1996 | Diepstraten | |
| 5,509,035 A | 4/1996 | Teidemann, Jr. et al. | |
| 5,524,136 A | 6/1996 | Bar-Noy et al. | |
| 5,570,411 A | 10/1996 | Sicher | |
| 5,574,973 A | 11/1996 | Borth et al. | |
| 5,590,172 A | 12/1996 | Lodwig et al. | |
| 5,627,878 A | 5/1997 | Strauch et al. | |
| 5,640,677 A | 6/1997 | Karlsson | |
| 5,642,353 A | 6/1997 | Roy, III et al. | |
| 5,649,308 A | 7/1997 | Andrews | |
| 5,657,317 A | 8/1997 | Mahany et al. | |
| 5,657,375 A | 8/1997 | Connolly et al. | |
| 5,703,881 A | 12/1997 | Kay et al. | |
| 5,724,647 A | 3/1998 | Sato | |
| 5,734,980 A * | 3/1998 | Hooper et al. | 455/434 |
| 5,734,984 A | 3/1998 | Reece et al. | |
| 5,745,523 A | 4/1998 | Dent et al. | |
| 5,778,024 A * | 7/1998 | McDonough | 375/216 |
| 5,784,693 A * | 7/1998 | Barber et al. | 455/434 |
| 5,796,727 A | 8/1998 | Harrison et al. | |
| 5,802,502 A | 9/1998 | Gell et al. | |
| 5,805,633 A | 9/1998 | Uddenfeldt | |
| 5,809,395 A | 9/1998 | Hamilton-Piercy et al. | |
| 5,812,955 A | 9/1998 | Dent et al. | |
| 5,815,525 A | 9/1998 | Smith et al. | |
| 5,875,186 A | 2/1999 | Belanger et al. | |
| 5,903,832 A * | 5/1999 | Seppanen et al. | 455/435.3 |
| 5,905,955 A * | 5/1999 | Bamburak et al. | 455/434 |
| 5,950,130 A * | 9/1999 | Coursey | 455/432.1 |
| 5,966,667 A * | 10/1999 | Halloran et al. | 455/552.1 |
| 5,995,832 A | 11/1999 | Mallinckrodt | |
| 6,002,918 A | 12/1999 | Heiman et al. | |
| 6,011,975 A | 1/2000 | Emery et al. | |
| 6,058,316 A | 5/2000 | Takahashi | |
| 6,134,453 A * | 10/2000 | Sainton et al. | 455/553.1 |
| 6,148,197 A * | 11/2000 | Bridges et al. | 455/432.3 |
| 6,185,413 B1 * | 2/2001 | Mueller et al. | 455/405 |
| 6,249,686 B1 * | 6/2001 | Dvorkin et al. | 455/552.1 |
| 6,298,235 B1 * | 10/2001 | Bamburak et al. | 455/434 |
| 6,311,064 B1 * | 10/2001 | Bamburak et al. | 455/434 |
| 6,418,318 B1 * | 7/2002 | Bamburak et al. | 455/455 |
| 6,490,272 B1 | 12/2002 | Eriksson | |
| 6,564,071 B1 | 5/2003 | Bergins et al. | |
| 6,771,961 B2 * | 8/2004 | Bamburak et al. | 455/434 |
| 6,782,259 B2 * | 8/2004 | Bamburak et al. | 455/434 |
| 6,847,822 B1 | 1/2005 | Dennison et al. | |
| 6,954,470 B2 | 10/2005 | Paneth et al. | |
| 6,961,584 B2 * | 11/2005 | Leedom, Jr. | 455/552.1 |
| 7,343,173 B2 * | 3/2008 | Leedom, Jr. | 455/552.1 |
| 7,346,350 B2 * | 3/2008 | Bamburak et al. | 455/434 |

FOREIGN PATENT DOCUMENTS

| | | |
|---|---|---|
| EP | 0369535 | 5/1990 |
| EP | 0 501 807 A2 | 9/1992 |
| EP | 0 504 807 A3 | 9/1992 |
| EP | 0 521 609 B1 | 4/1997 |
| GB | 2120049 | 11/1983 |
| WO | 90-13211 | 11/1990 |
| WO | WO 93/17505 A1 | 9/1993 |
| WO | WO 95/17077 | 6/1995 |
| WO | WO 97/09838 | 3/1997 |

OTHER PUBLICATIONS

Foschini, "Channel Cost of Mobility", IEEE Transactions on Vehicular Technology, Nov. 1993, vol. 42, No. 4, pp. 414-424.

Kyocera Wireless Corp.'s Third Supplemental Response to MLR's First Set of Interrogatories, pp. 1, 6-11 and Exhibit A, pp. 30-39, Mar. 15, 2007.

Notification of Transmittal of International Preliminary Examination Report, Mailing Date: Apr. 18, 1996.

PCT Search Report for PCT/SE96/01113 dated Jan. 14, 1997, 2 pages.

Supplementary European Search Report for EP 95 90 8417 dated Jun. 28, 1999, 3 pages.

Programmer's Guide, Electronic Messaging System (EPS), Complex Architecture Inc., Feb. 5, 1993 (Version 1.0), c. 1992, 187 pages.

Canadian Patent Appl. No. 2179151, Official Action dated May 18, 2004, 5 pages.

Europoean Patent Appl. No. 95 908 417.9-2412, Official Action dated Sep. 16, 2003, 10 pages.

European Patent Appl. No. 95 908 417.9-2412, Official Action dated May 3, 2004, 4 pages.

European Patent Application No. 05022037.5, Official Action dated May 3, 2007, 1 page.

European Patent Application No. 05022037.5, Official Action dated Sep. 15, 2006, 18 pages.

Canadian Patent Application No. 2,179,151; Official Action dated Apr. 5, 2005, 3 pages.

PCT International Application No. PCT/US94/14159, International Search Report dated Dec. 15, 1993; 3 pages.

PCT International Application No. PCT/US94/14159, International Preliminary Examination Report dated Mar. 25, 1996; 7 pages.

"Dnya T-A-C 6000X Universal Mobile Telephone", Motorola, Inc. 1984, Motorola 000017 thru Motorola 000022.

Automatic Roaming, Cellular Radiotelecommunications Intersystem Operations (IS-41.3 Revision B), 1992, pp. 1-59.

Data Communications, Cellular Radiotelecommunications Intersystem Operations (IS-41.5 Revision B), 1992, pp. 1-84.

Cortese, Racotek, Portable Computers and Wirelss Communications, 1993, pp. 176-178.

Growney, Motorola Paging & Wireless Data Group, Portable Computers and Wireless Communications, 1993, pp. 155-156.

* cited by examiner

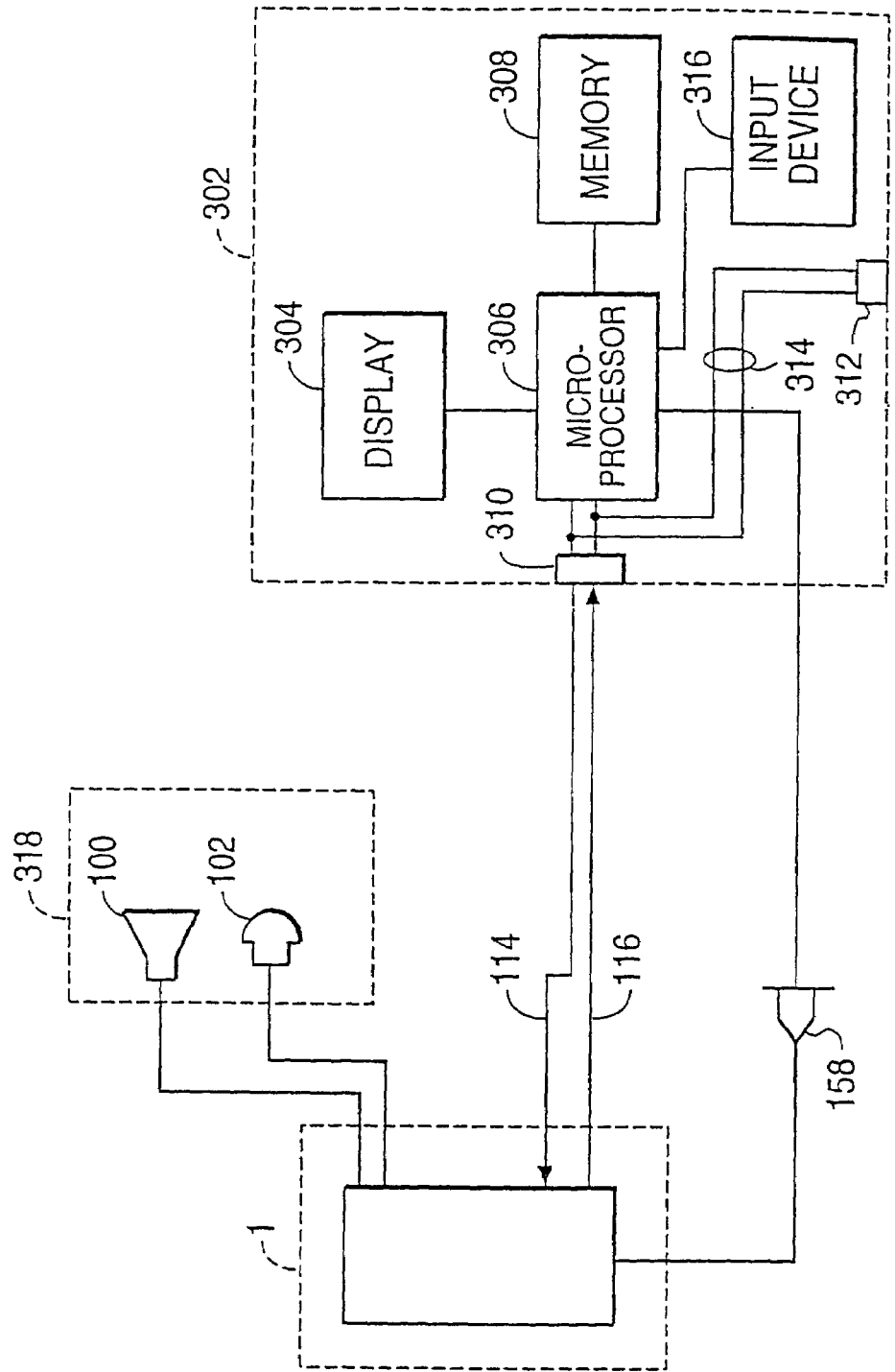

FIG. 4A
FIG. 4B
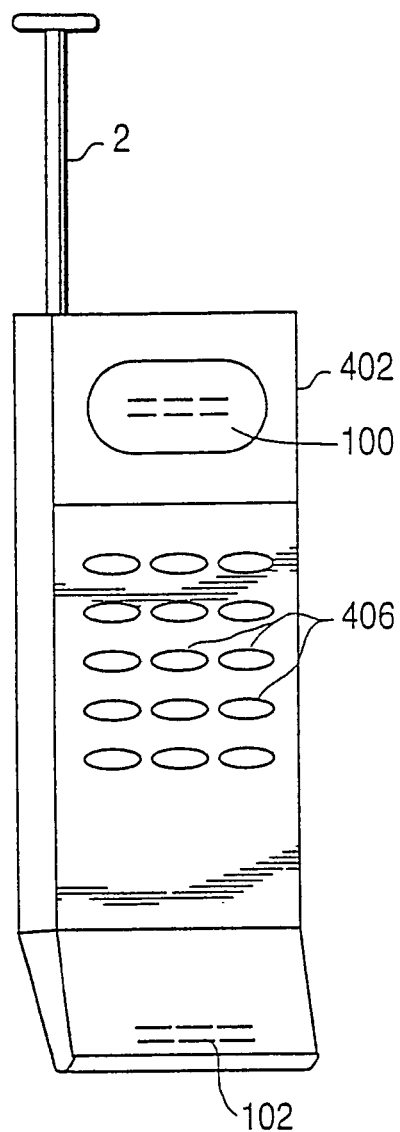
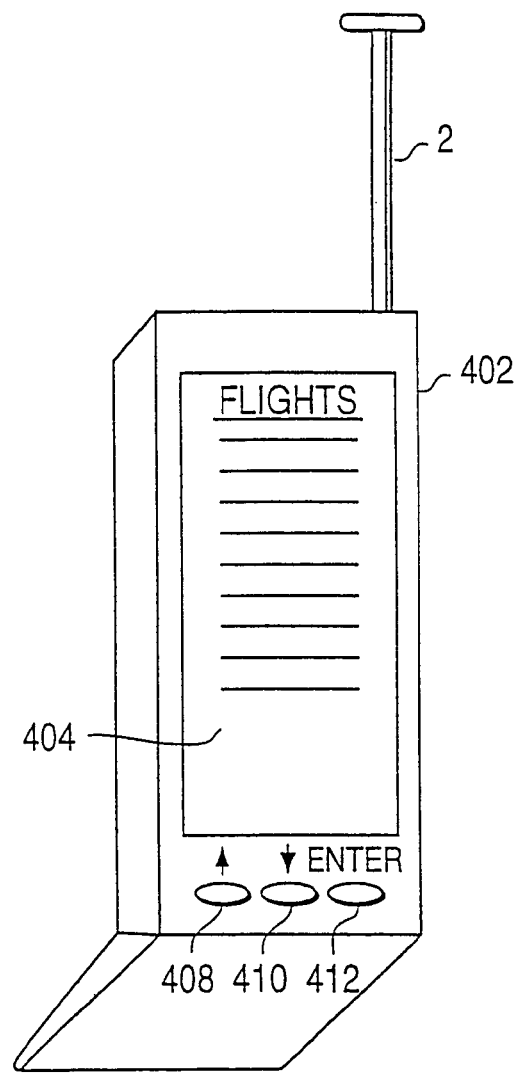

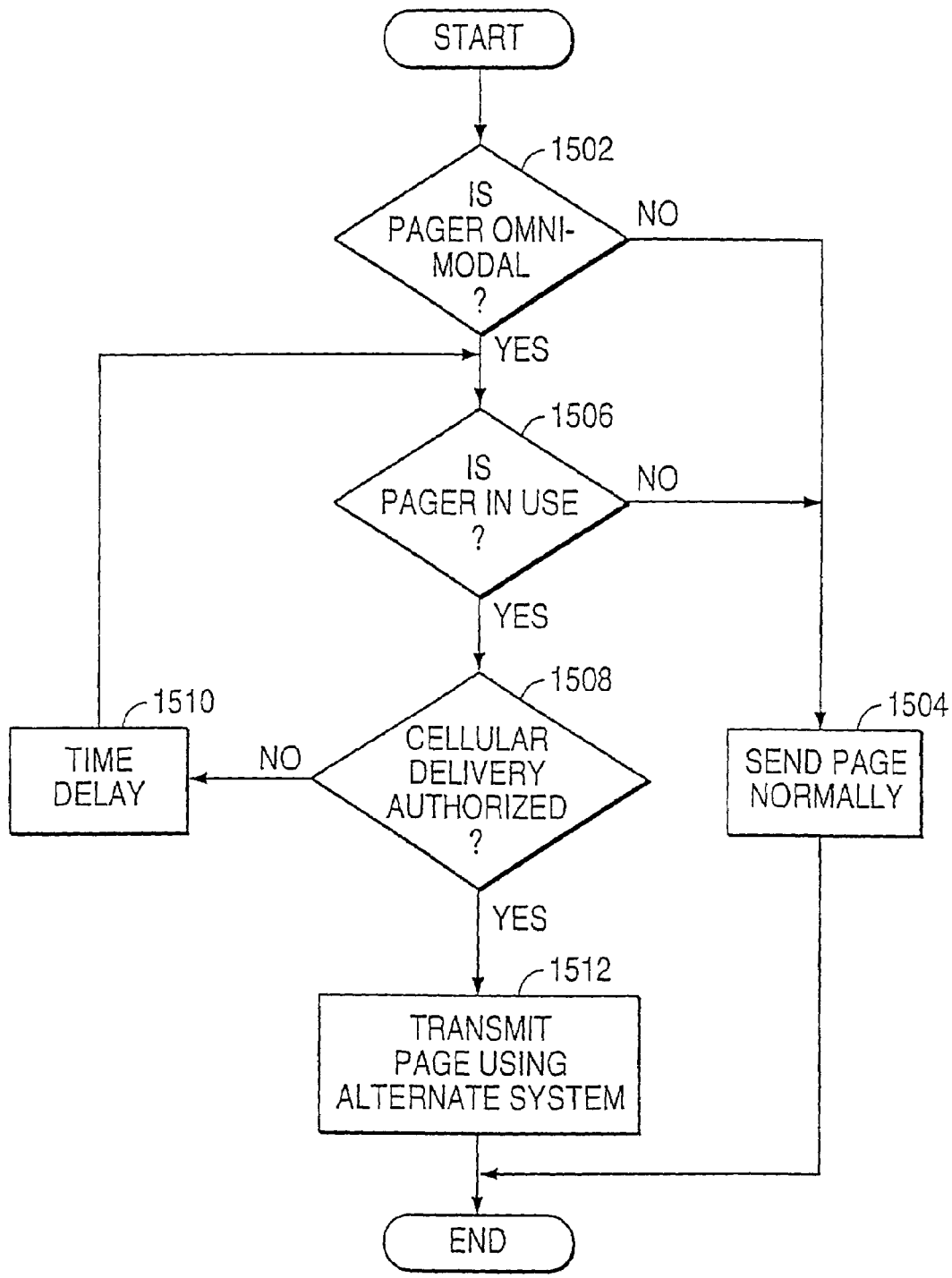

ADAPTIVE OMNI-MODAL RADIO APPARATUS AND METHODS

This application is a divisional of patent application Ser. No. 09/670,696, filed Sep. 28, 2000, now U.S. Pat. No. 6,934,558, which is a divisional of patent application Ser. No. 09/149,292, filed Sep. 9, 1998, now U.S. Pat. No. 6,134,453, which is a divisional of patent application Ser. No. 08/707,262, filed Sep. 4, 1996, now U.S. Pat. No. 5,854,985, which is a continuation of patent application Ser. No. 08/167,003, filed Dec. 15, 1993, now abandoned.

BACKGROUND OF THE INVENTION

This invention relates generally to frequency and protocol agile, wireless communication devices and systems adapted to enable voice and/or data transmission to occur using a variety of different radio frequencies, transmission protocols and radio infrastructures.

Many communication industry experts believe that a personal information revolution has begun that will have as dramatic an impact as did the rise of personal computers in the 1980's. Such experts are predicting that the personal computer will become truly "personal" by allowing virtually instant access to information anytime or anywhere. There exists no consensus, however, on the pace or form of this revolution.

For example, the wireless communication industry is being fragmented by the emergence of a substantial number of competing technologies and services including digital cellular technologies (e.g. TDMA, E-TDMA, narrow band CDMA, and broadband CDMA), geopositioning services, one way and two-way paging services, packet data services, enhanced specialized mobile radio, personal computing services, two-way satellite systems, cellular digital packet data (CDPD) and others. Fragmenting forces within the wireless communication industry have been further enhanced by regulatory actions of the U.S. government. In particular, the U.S. government is preparing to auction off portions of the radio spectrum for use in providing personal communication services (PCS) in a large number of relatively small contiguous regions of the country. The U.S. government is also proposing to adopt regulations which will encourage wide latitude among successful bidders for the new radio spectrum to adopt innovative wireless technologies.

Until the market for wireless communication has experienced an extended "shake-out" period it is unlikely that a clear winner or group of winners will become apparent. Any portable unit which is capable of interacting with more than one service provider or radio infrastructure would obviously have advantages over a portable unit which is capable of accessing only a single service provider. Still better would be a portable unit which could be reprogrammed to interact with a variety of different service providers. Previous attempts to provide such multi modal units have produced a variety of interesting, but less than ideal, product and method concepts.

Among the known multi-modal proposals is a portable telephone, disclosed in U.S. Pat. No. 5,127,042 to Gillig et al., which is adapted to operate with either a conventional cordless base station or cellular base station. U.S. Pat. No. 5,179,360 to Suzuki discloses a cellular telephone which is capable of switching between either an analog mode of operation or a digital mode of operation. Yet another approach is disclosed in U.S. Pat. No. 4,985,904 to Ogawara directed to an improved method and apparatus for switching from a failed main radio communication system to a backup communication system. Still another proposal is disclosed in U.S. Pat. No. 5,122,795 directed to a paging receiver which is capable of scanning the frequencies of a plurality of radio common carriers to detect the broadcast of a paging message over one of the carriers serving a given geographic region. In U.S. Pat. No. 5,239,701 to Ishii there is disclosed a radio receiver which is responsive to an RF signal containing a plurality of channel frequencies, each having broadcast information, and a circuit for producing a wide band version of the received RF signal and a circuit for producing a narrow band version of the received RF signal.

While multi-modal in some regard, each of the technologies disclosed in the above listed patents is highly specialized and limited to a specific application. The systems disclosed are clearly non-adaptive and are incapable of being easily reconfigured to adapt to different transmission protocols or different radio infrastructures. Recently, Motorola has announced beta testing of a system called "MoNet" which will allegedly allow users to operate on whatever wireless network happens to be available using protocol and frequency agile radio modems. The MoNet technology will be integrated in both networks and mobile devices and will permit first time users to fill out an electronic application, transmit it, and receive a personal ID to allow the user to operate on any of several mobile networks yet receive just one bill. Another provider of an open system is Racotek of Minneapolis, Minn. which offers client server architecture designed to be portable across different mobile devices, host platforms, and radio infrastructures.

While the limited attempts to deal with the fragmentation of the wireless communication industry have had some merits, no one has yet disclosed a truly self adaptive, omni-modal wireless product which enables an end user to access conveniently various wireless services in accordance with a selection process which is sufficiently under the control of the end user.

SUMMARY OF THE INVENTION

A fundamental objective of the subject invention is to overcome the deficiencies of the prior art by providing a truly omni-modal wireless product and method which is adaptive to the selectively variable desires of the end user.

Another more specific object of the subject invention in the provision of a product which would be capable of utilizing any one of the wireless data services within a given geographic area based on a user determined criteria such as: (1) the cost of sending a data message, (2) the quality of transmission link (signal strength, interference actual or potential), (3) the potential for being dropped from the system (is service provider at near full capacity), (4) the security of transmission, (5) any special criteria which the user could variably program into his omni-modal wireless product based on the user's desires or (6) any one or more combinations of the above features that are preprogrammed, changed or overridden by the user.

Yet another object of the subject invention is to provide an omni-modal wireless product which would allow for enormous product differentiation. For example original equipment manufacturers (OEM's) could provide specialized interface features for the end user. Each OEM could provide specialized hardware controls appropriate for various user groups.

Another object of the subject invention is to provide an omni-modal wireless product which can allow for adaptive service provider selection based on user experience with specific service providers.

A more specific object of the subject invention is to provide an omni-modal wireless product which would have the effect of inducing intense competition for customers among various wireless data service providers based on quality of service and price by allowing the user to easily and conveniently identify the service providers that best meet the user's performance requirements.

Another object of the invention is to provide a network of omni-modal wireless products and service providers which is designed to provide the most business and profit making potential to the service providers who best meet the varying demands of the greatest number of omni-modal wireless product users.

Still another objective of the subject invention is to promote and encourage introduction of innovative technology which will satisfy the desires of end users to receive the best possible quality wireless service at the lowest possible cost by promoting real time-adaptive price and service competition among cell service providers.

Another objective of the subject invention is to allow wireless service providers to broadcast electronically as part of any "handshaking" procedure with a omni-modal wireless product information such as (1) rate information and (2) information regarding system operating characteristics such as percent of system capacity in use and/or likelihood of being dropped.

Still another objective of the subject invention is to create a user oriented source enrollment and billing service in the wireless data market by establishing uniform standard for "handshakes" to occur between cell service providers and omni-modal wireless products.

A more specific object of the invention is to provide a standard chip or chipset including a radio transceiver specifically designed to be used in all types of omni-modal wireless products.

A still more specific object of the invention is to provide a standard radio chip or chipset adapted for use in all types of omni-modal wireless products including a variety of operational modes including operation on the U.S. public analog cellular telephone network (AMPS).

Still another object of the invention is to provide a standard radio chip or chipset for use in all types of omni-modal wireless products including circuitry for both voice and data communications over AMPS. Other supported communications protocols would include CDPD which is a packet data service based on the AMPS network.

These objects and others are achieved in the present invention by an omni-modal radio circuit implemented by a standard radio computing chip or chipset which can serve as a computer (special or general purpose), or as an interface to a general purpose personal computer. The chip preferably includes a modem and associated processing circuits. So that it can perform at least basic processing functions such as displaying data, accepting input, etc., the chip may also incorporate at least a basic microprocessor. The processor may provide only predetermined functions, accessible through a standard applications programming interface, or in more advanced designs the processor can run other software or firmware added by the product maker. Exemplary processor functions of the chip include radio network interface control (call placement, call answering), voice connection, data transmission, and data input/output. The chip can be used to implement a variety of omni-modal devices and can provde computing resources to operate fundamental communications programs.

BRIEF DESCRIPTION OF THE DRAWINGS

FIG. 3 is a block schematic diagram of a personal communicator implemented using an omni-modal radio communications circuit according to the present invention;

FIG. 4A is a plan view of the front of a data transmission and display radiotelephone implemented using an omni-compatible radio communications circuit;

FIG. 4B is a plan view of the back of a data transmission and display radiotelephone implemented using an omni-compatible radio communications circuit;

FIG. 15 is a flowchart showing a method of relaying paging signals to the omni-modal device of the present invention.

DETAILED DESCRIPTION OF THE PREFERRED EMBODIMENTS

Figure 1A:
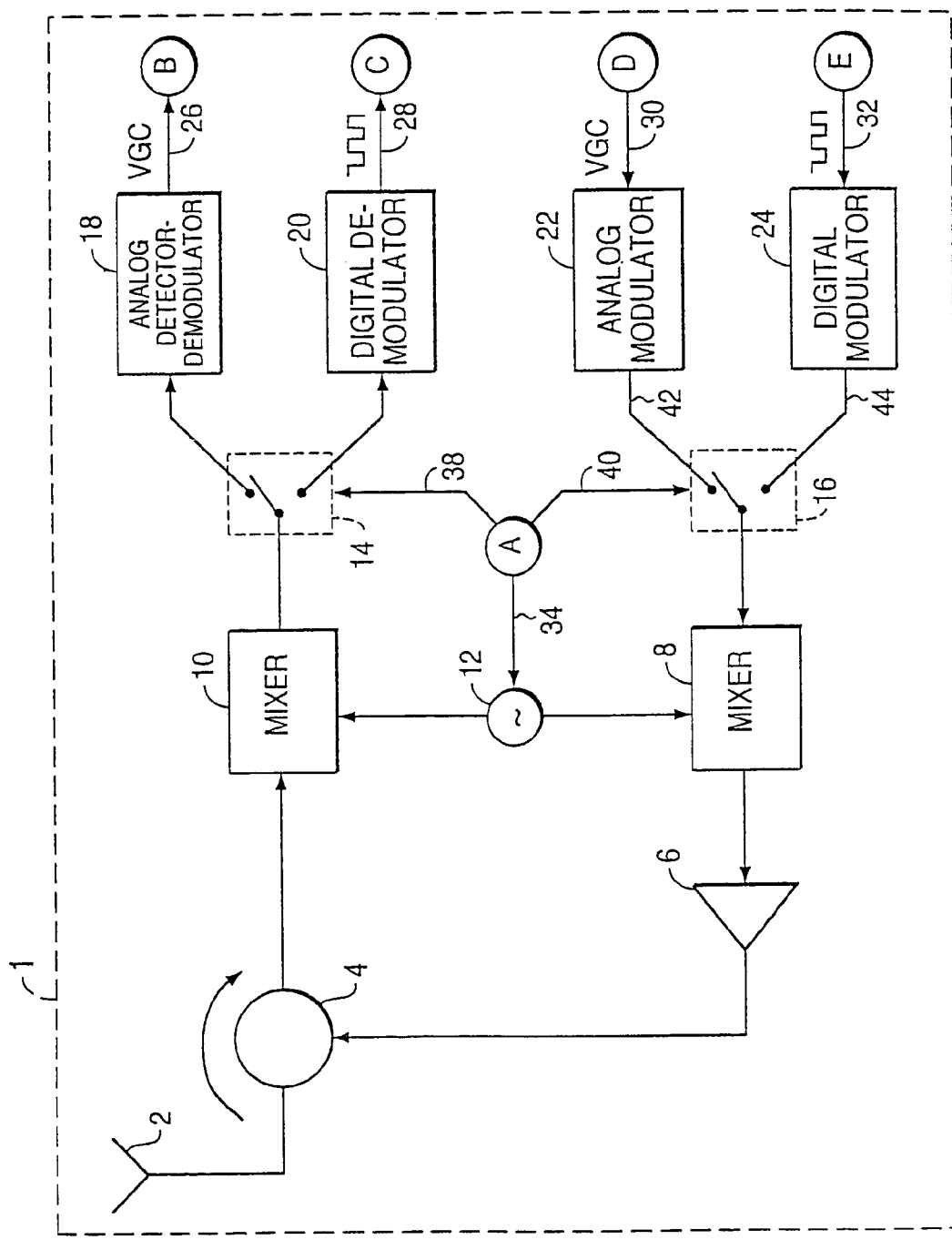
FIG. 1 is a block schematic diagram of an omni-modal radio communications circuit according to the present invention.
Figure 1B:
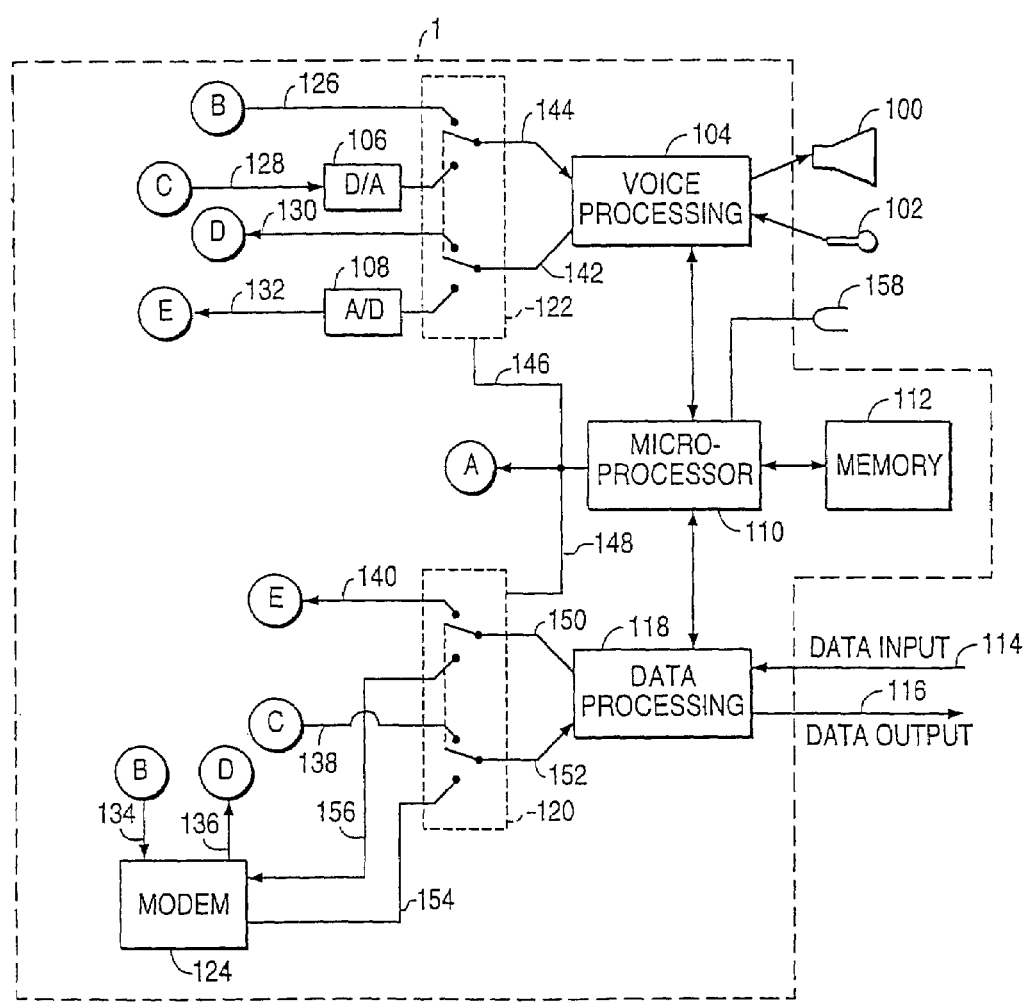

A preferred embodiment of a standardized radio processing circuit 1 is shown in FIGS. 1A and 1B. The standardized radio processing circuit 1, shown in FIGS. 1A and 1B taken together, may be implemented on a single VLSI chip or on a set of VLSI chips making up a chipset. As will be seen, this chip or chipset provides a standard building block which can be used to make a plurality of consumer products that provide data transmission capability. As will be seen later with reference to FIGS. 2 through 8, by adding minimal external components to the standardized circuit 1, a wide variety of products can be produced. Also, as will be seen, the standardized circuit 1 can be advantageously implemented on a removable card with a standardized interface connector or connectors, so that it can then be selectively inserted into and removed from a variety of devices to provide the devices with radio information transmission capability.

In terms of the preferred functional and operational characteristics of circuit 1, it is particularly significant that this circuit provides a multi-modal or omni-modal communications capability. That is, circuit 1 can be adjusted by the user, or automatically under stored program control, to transfer information over at least two different radio communications networks, and preferably all networks available in a particular area within the frequency range of the transceiver of circuit 1.

Examples of radio communications networks which circuit 1 may be designed to use include commercial paging networks; the U.S. cellular telephone network or Advanced Mobile Phone System (AMPS); alternative cellular telephone network standards such as the European standard; digitally modulated radiotelephone systems operating under various encoding techniques such as TDMA, CDMA, E-TDMA, and BCDMA; Cellular Digital Packet Data (CDPD); Enhanced Specialized Mobile Radio (ESMR); ARDIS; Personal Cellular Systems (PCS); RAM; global positioning systems; FM networks which transmit stock prices or other information on subcarriers; satellite-based networks; cordless landline telephones (such as 49 Mhz and particularly 900 Mhz systems); and wireless LAN systems. Preferably, circuit 1 is also designed to use the landline/public switched telephone network (PSTN).

As another feature, the omni-modal circuit 1 may perform local positioning calculations to accurately determine its location by monitoring precisely synchronized timing signals which may be broadcast by cell sites for this purpose. If such timing signals were provided, the omni-modal circuit 1 could receive the signals, determine the relative time delay in receiving at least three such signals from different transmitter locations, and triangulate to determine the distance of the omni-modal circuit to each of the transmitters. If the omni-modal circuit 1 is installed in a vehicle, this information may be used to determine the location of the vehicle.

As will be seen, for each system which can be accessed by circuit 1, appropriate cross connections are provided between the radio circuit or landline interface, as selected, and voice or data sources and destinations. The appropriate cross connections are established under program control and include conversions between digital and analog signal forms at appropriate points in cases where a signal in one form is to be transmitted using a method for which a different signal form is appropriate. The operating parameters of the transceiver may be optimized by a digital signal processor for either voice or data transmission.

In addition, a library of command, control and data transmission protocols appropriate for each supported system may be included in circuit 1, and the device can implement the correct protocols by consulting a lookup table during transmissions to obtain the data channel protocols appropriate to the system selected. In another embodiment, the library of command, control, and data transmission protocols may be replaced, or supplemented, by information transmitted over the radio frequencies to the device by the carrier, or information downloaded from a hardwired connection to another device. Flash memory, EEPROMs, or non-volatile RAM can be used to store program information, permitting replacement or updating of the operating instructions used by the device.

As examples, the library functions accessible by the device (and also by external devices which may call the library functions) may include the following: Select RF modulation frequency; select RF modulation protocol; select data formatting/conditioning protocol; transmit data in input stream using selected network and protocol; select output; select input; select data/voice mode; answer call; generate DTMF tones and transmit on selected network; scan for control channels/available systems; obtain cost information for current selected system; obtain cost information for all systems; obtain operating quality information for current system; obtain operating quality information for all systems; request transmission channel in system; obtain signal strength for current channel; obtain signal strength for all active systems; and initiate a transmission on the selected network.

FIG. 1A shows a block schematic diagram of a preferred embodiment of an omni-modal radio communication radio frequency (RF) circuit. In the example shown, the RF circuit includes antenna 2, diplexer 4, amplifier 6, transmit mixer 8, receiver mixer 10, programmable local oscillator 12, modulation selector switches 14 and 16, analog detector-demodulator 18, digital demodulator 20, analog modulator 22, digital modulator 24, voice grade channel output 26, digital output 28, voice grade channel input 30, and digital input 32.

Voice grade channel output 26 is connected to analog detector-demodulator 18 and digital output 28 is connected to digital demodulator 20. Analog detector-demodulator 18 and digital demodulator 20 are selectively connected to receiver mixer 10 through switch 14. Receiver mixer 10 is connected to both local oscillator 12 and diplexer 4. Diplexer 4 is connected to antenna 2. These components provide radio frequency receive circuitry that allows selective reception and demodulation of both analog and digitally modulated radio signals.

Voice grade channel input 30 is connected to analog modulator 22 and digital input 32 is connected to digital modulator 24. Analog modulator 22 and digital modulator 24 are selectively connected to transmit mixer 8 through switch 16. Transmit mixer 8 is connected to both local oscillator 12 and amplifier 6. Amplifier 6 is connected to diplexer 4 and diplexer 4 is connected to antenna 2. These components comprise radio frequency transmit circuitry for selective transmission of analog or digitally modulated radio signals.

The operation of the omni-modal radio communication RF circuit shown in FIG. 1A will now be described in more detail. Antenna 2 serves to both receive and transmit radio signals. Antenna 2 is of a design suitable for the frequency presently being received or transmitted by the RF circuit. In the preferred embodiment, antenna 2 may be an antenna suitable for receiving and transmitting in a broad range about 900 Mhz. However, different antennas may be provided to permit different transceiver ranges, including dipole, yagi, whip, micro-strip, slotted array, parabolic reflector, or horn antennas in appropriate cases.

Diplexer 4 allows antenna 2 to receive broadcast radio signals and to transmit the received signals to the demodulators 18 and 20, and to allow modulated radio signals from modulators 22 and 24 to be transmitted over antenna 2. Diplexer 4 is designed so that signals received from amplifier 6 will be propagated only to antenna 2, while signals received from antenna 2 will only be propagated to receiver mixer 10. Diplexer 4 thus prevents powerful signals from amplifier 6 from overloading and destroying receiver mixer 10 and demodulators 18 and 20.

The receive path of the omni-modal RF circuit comprises receiver mixer 10, which is connected to, and receives an input signal from, diplexer 4. Receiver mixer 10 also receives a reference frequency from local oscillator 12. Receiver mixer 10 converts the signal received from diplexer 4 to a lower frequency signal and outputs this intermediate frequency on output line 36 to switch 14. Switch 14 is connected through control line 38 to a microprocessor (not shown). Control line 38 selectively controls switch 14 to pass the intermediate frequency signal on output line 36 to either analog detector-demodulator 18 or to digital demodulator 20. This selection is controlled based upon the type of signal currently being received. For example, if the omni-modal circuit 1 is tuned to an analog communication system, switch 14 would be connected to analog detector demodulator 18. If, however, the omni-modal circuit 1 is receiving a digital modulated signal, switch 14 would be in a state to allow an intermediate frequency on output line 36 to be transmitted to digital demodulator 20.

Analog detector demodulator 18 receives analog signals through switch 14 from receiver mixer 10 on output line 36. Analog detector demodulator converts the RF modulated signal received as an intermediate frequency into a voice grade channel or VGC. The voice grade channel may comprise an audio frequency spectrum going from approximately 0 Hz to approximately 4 KHz. Analog detector demodulator 18 is designed for demodulation of analog radio frequency signals. For example, analog detector demodulator would be capable of demodulating a frequency modulated (FM) radio signals. Analog detector demodulator 18 may also be capable of demodulating amplitude modulated (AM) radio signals.

Digital demodulator 20 is designed to demodulate digital signals received from receiver mixer 10 through switch 14. Digital demodulator 20 is designed to demodulate digital signals such as, for example, pulse code modulation (PCM), time division multiple access (TDMA), code division multiple access (CDMA), extended time division multiple access (E-TDMA) and broad band code division multiple access (BCDMA) signals. The output 28 from digital demodulator 20 could consist of a digital bit stream.

The transmit circuitry of the omni-modal RF circuit will now be described in detail. Analog voice grade channel signals can be received over analog input 30 which is connected to analog modulator 22. Analog modulator 22 acts-to-modulate the received voice grade channel onto an intermediate frequency signal carrier. Analog modulator 22 would be capable of modulating frequency modulation (FM) or amplitude modulation (AM) signals, for example.

As can be seen in FIG. 1A, analog modulator 22 is connected to switch 16. The intermediate frequency output from analog modulator 22 on output line 42 is sent to switch 16. Switch 16 is connected to a microprocessor (not shown) in a manner similar to switch 14 described above. Switch 16 is capable of selectively connecting transmit mixer 8 to either analog modulator 22 or digital modulator 24. When switch 16 is connected to analog modulator 22 through output line 42, analog modulated signals are transmitted to transmit mixer 8.

Digital input can be received by the transmit portion of the RF modulator circuitry through digital input 32. Digital input 32 is connected to digital modulator 24 which acts to modulate the received digital data onto an intermediate frequency RF carrier. Digital modulator 24 may preferably be capable of modulating the signal into a PCM, TDMA, E-TDMA, CDMA and BCDMA format. The output 44 of digital modulator 24 is connected to switch 16. Switch 16 can be controlled through control line 40 to select the digital modulated signal on output 44 and to selectively transmit that signal to transmit mixer 8.

Transmit mixer 8 is connected to programmable local oscillator 12 which is capable of generating frequencies that cover the frequency spectrum of the desired communication systems. Transmit mixer 8 operates in a manner well known in the art to convert the intermediate frequency signal received from switch 16 to a radio frequency for transmission over a radio communication system. The output of transmit mixer 8 is connected to amplifier 6. Amplifier 6 acts to amplify the signal to insure adequate strength for the signal to be transmitted to the remote receiving station. Amplifier 6 may be connected to control circuitry to allow the power output of amplifier 6 to be varied in accordance with control signals received from the control circuitry. The output of amplifier 6 is connected to diplexer 4 and, as described above, to antenna 2.

FIG. 1B is a block schematic diagram of the input and control circuitry of omni-modal circuit 1. As can be seen from FIG. 1B, the input and control circuitry comprises speaker 100, microphone 102, voice processing circuitry 104, digital to analog converter 106, analog to digital converter 108, first selection switch 122, microprocessor 110, memory 112, data input 114, data output 116, data processing circuitry 118, second selector switch 120 and modem 124.

Microprocessor 110 is connected to memory 112 and operates to control the input circuitry as well as the programmable local oscillator 12 and switches 14 and 16 shown in FIG. 1A. Memory 112 can contain both data storage and program information for microprocessor 110. Microprocessor 110 may be any suitable microprocessor such as an Intel 80×86 or Motorola 680×0 processor. Memory 112 contains a program that allows microprocessor 110 to selectively operate the voice processing circuitry, data processing circuitry and switches to select the appropriate transmission channel for the communication signal currently being processed. In this manner, microprocessor 110 allows omni-modal circuit 1 to selectively operate on a plurality of radio communication systems.

As can be seen in FIG. 1B, an externally provided speaker 100 and microphone 102 are connected to voice processing circuitry 104. Voice processing circuitry 104 has output 142 and input 144. Voice processing output 142 is connected to switch 122. Similarly, voice processing input 144 is connected to switch 122. Switch 122, which may be an electronic analog switch, comprises two single pole double throw switches which operate in tandem to selectively connect voice output 142 and voice input 144 to appropriate data lines. Switch 122 is connected through control line 146 to microprocessor 110. Control line 146 allows microprocessor 110 to selectively operate switch 122 in response to commands received from the user or in response to a program in memory 112. In a first position, switch 122 connects voice processing input 144 to voice grade channel output 126. Referring to FIG. 1A, voice grade output 126 is connected to the output 26 of analog detector demodulator 18. In this manner, voice processing circuitry 104 is able to receive demodulated analog voice signals from analog detector demodulator 18. When voice processing input 144 is connected to 126, voice processing output 142 will be connected to voice input 130. As can be seen in FIG. 1A, voice input 130 is connected to voice grade channel input 30 of analog modulator 22. In this manner, voice processing circuitry 104 can transmit voice through the transmit circuitry of FIG. 1A.

If switch 122 is changed to its alternate state, voice processing input 144 will be connected to digital to analog converter 106. Digital to analog converter 106 is connected to digital input 128 which, referring to FIG. 1A, is connected to digital output 28 of digital demodulator 20. Digital to analog converter 106 acts to receive a digital information bit stream on digital input 128 and to convert it to an analog voice grade channel. The analog voice grade channel from digital to analog converter 106 is sent through voice input 144 to voice processing circuitry 104. Voice processing circuitry 104 can then amplify or alter the voice grade channel signal to the taste of the user and outputs the signal on speaker 100. Voice processing output 142 is connected to analog to digital converter 108 which in turn is connected to digital output 132. Digital output 132 is connected in FIG. 1A to digital input 32 and to digital modulator 24. In this manner, voice processing circuitry 104 is capable of transmitting a voice or other analog voice grade channel signal through a digital modulation system.

As noted above, omni-modal circuit 1 is capable of transmitting data over a plurality of radio frequency communication systems. As can be seen in FIG. 1B, data input 114 and data output 116 are connected to data processing circuitry 118. Data input 114 allows the processing circuitry to receive data from any number of user devices. The format of the data received on data input 114 may be variable or standardized depending on the circuitry provided in data processing circuitry 118. For example, data input 114 may use a standard RS-232 serial interface to receive data from a user device. Data input 114 may also use a parallel twisted pair or HPIB interface as well. Data output 116 similarly transmits data in a format compatible with the equipment being used by the user. Data processing circuitry 118 is connected to microprocessor 110 which acts to control the formatting and conditioning of the data done by data processing circuitry 118. For example, data processing circuitry 118 may add protocol information or error correction bits to the data being received on data input 114. Conversely, data processing circuitry 118 may act to remove overhead bits such as protocol or error correction bits from the data prior to its output on data output 116. Data processing circuitry 118 is connected to switch 120 through data output 150 and data input 152. Switch 120 operates in a manner similar to that described with respect to switch 122 above. Switch 120 is connected to microprocessor 110 through control line 148. Microprocessor 110 operates to control switch 120 to selectively connect the data output 150 to either digital circuit output 140 or to modem input 156. Switch 120 also operates to connect digital data input 152 to either digital input 138 or digital modem output 154. Modem 124 may be any standard modem used to modulate digital data onto an analog voice grade channel. For example, modem 124 may incorporate a modem chip set manufactured by Rockwell International Corporation that receives digital data and modulates it into a 4 KHz band width for transmission over standard telephone systems. Modem input 156 receives data from data processing circuitry 118 through data input 152 and switch 120. The data received over modem input 156 is modulated onto a voice grade channel and output on modulated modem output 136. Modulated modem output 136 is connected to voice grade channel input 30 of analog modulator 22 shown in FIG. 1A. Similarly, digital modem output 154 receives demodulated baseband signal from modem 124. The modulated data signal is received by modem 124 from modem input 134, which is connected to voice grade channel output 26 of analog detector demodulator 18. Modem 124 acts to demodulate the data received over modem input 134 and outputs a digital data stream on digital modem output 154. This digital data stream is connected through switch 120 and data input 152 to data processing circuitry 118. As described above, data processing circuitry 118 conditions and formats the data received from the modem and outputs the data to the user on data output 116. If the user has selected a digital RF transmission system it is not necessary to use modem 124. In this case, switch 120 is operated so that the digital data output 150 from data processing circuitry 118 is connected through digital output 140. Digital output 140 is connected to digital input 32 of digital modulator 24 shown in FIG. 1A. Similarly, data input 152 to data processing circuitry 118 is connected through digital input 138 to digital output 28 of digital demodulator 20 shown in FIG. 1A.

As is readily apparent from the above discussion, FIGS. 1A and 1B together depict a radio frequency communication system that is capable of operating over a plurality of different radio channels and is further capable of transmitting either analog or digital data information signals as well as analog or digital voice signals. The system is also capable of transmitting a 4 Khz voice grade channel having both data and voice simultaneously present.

FIG. 1B broadly depicts the operation of the circuit which involves the selection by the microprocessor 110 of either a voice or data call. Once this selection is made, the data is then sent to the RF modulation circuitry shown in FIG. 1A. The RF modulation circuitry is capable of modulating or demodulating either analog or digital signals.

Circuit 1 is designed to facilitate product differentiation by companies making use of circuit 1 as a standard building block for radio voice and/or data communications devices. For example, each manufacturer may provide specialized interface features for the user, and specialized hardware controls appropriate for various user groups. Circuit 1 is particularly advantagous in facilitating these goals in that it provides microprocessor 110 and memory 112 that allow manufacturers to customize the operation of the circuit with little or no additional components. Furthermore, circuit 1 could be pre-programmed with a series of primitives that would allow a manufacturer to quickly and easily integrate the complex features of the device into a use friendly consumer product.

Figure 2:
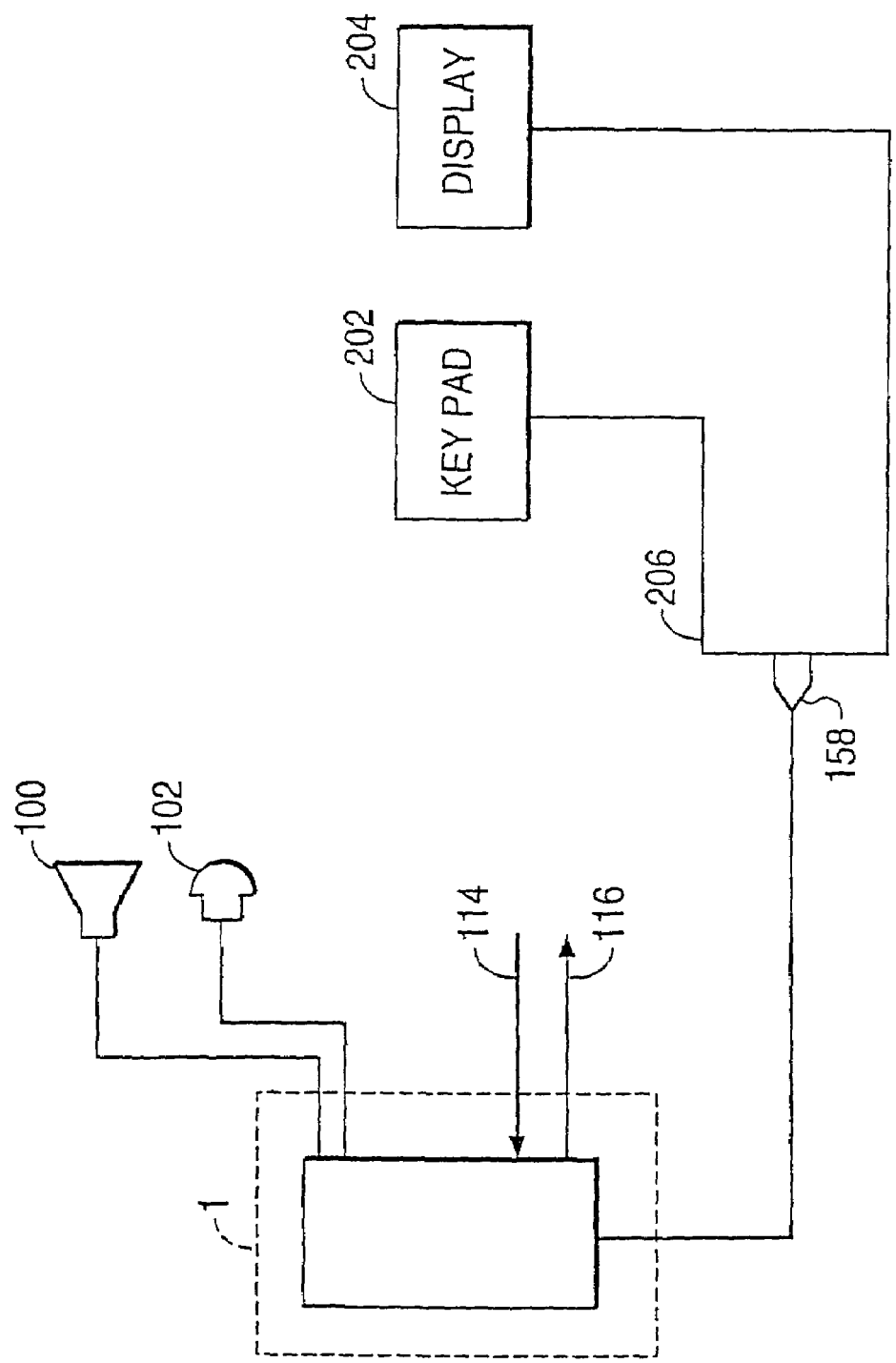
FIG. 2 is a block schematic diagram of an advanced cellular telephone implemented using an omni-modal radio communications circuit according to the present invention.

Referring next to FIG. 2, a block schematic diagram of an advanced cellular telephone implemented using an omni-modal radio communication circuit 1 shown in FIG. 1 is depicted. The omni-modal radio communication circuit of FIGS. 1A and 1B is shown in outline form as reference number 1. Also shown in FIG. 2 are speaker 100, microphone 102, digital data input 114, digital data output 116 and universal digital input/output interface 158. As can be seen from FIG. 2, the present radio communications circuit allows a cellular phone to be constructed with the addition of minimal components. The advanced cellular phone of FIG. 2 includes keypad 202, display 204 and interface connector 206. Keypad 202 and display 204 are connected to interface connector 206. Interface connector 206 connects with the universal digital input/output interface 158 which connects to the omni-modal radio communications circuit 1 depicted in more detail in FIGS. 1A and 1B. Keypad 202 may be any keypad used with telephone devices. Similarly, display 204 can be any display used with standard cellular telephones or other computing devices. For example, display 204 could be a light-emitting diode (LED) or a liquid crystal display (LCD) as commonly used with telephones, calculators and/or watches.

As shown in FIG. 2, keypad 202 and display 204 connect through interface connector 206 to universal digital input/output interface 158 of the omni-modal RF circuit. The universal digital input/output interface 158 allows the omni-modal circuit 1 to be connected with a variety of electronic devices including keypad 202 and display 204. It is contemplated that universal digital input/output interface 158 may comprise one connector or a plurality of connectors each having different data protocols transmitted and received therein. For example, universal input/output interface 158 may include a keyboard or keypad interface circuit as well as a display interface circuit. The keypad interface circuit would include necessary circuitry for buffering key strokes and receiving key input data from a keyboard. The display driver circuitry would include a memory and processor necessary for the display of data stored in the display memory. In this manner, the omni-modal circuit 1 is capable of interacting with many different keypads and display devices. In one preferred embodiment, the universal interface connector includes a serial addressable interface wherein the components connected to the serial interface have a unique address byte assigned to each component. This allows the serial interface to communicate with a plurality of devices sequentially. Keypad 202 for example may be assigned an address byte of 001, while display 204 would be assigned address byte of 002. When the universal interface desires to communicate from microprocessor 110 shown in FIG. 1B with the keypad or display, the appropriate address would be included in the data sent to the universal interface connector. Keypad 202 and display 204 would monitor the data coming across the universal interface 158 and would respond only to those bytes having an appropriate address corresponding to the selective device.

The advanced cellular phone of FIG. 2 includes digital data input 114 and digital data output 116. This allows the phone to transmit digital computer data without the need of bulky external interface devices. For example, it is often necessary to use a tip and ring interface emulator to communicate over a cellular network from a computer or other data source. With the present invention, however, it is only necessary to connect to the digital data input 114 and to the digital data output 116. The data protocol used on these may be any protocol suitable for data communication, but in the preferred embodiment would be a RS 232 serial interface. By connecting a computer serial interface port to data input 114 and data output 116, data may be transmitted using the omni-modal circuit 1. The microprocessor 110 and memory 112 shown in FIG. 1B would configure the internal circuitry of the omni-modal circuit for data transmission.

Also shown in FIG. 2 are speaker 100 and microphone 102. Speaker 100 and microphone 102 may be standard speakers and microphones used on cellular telephones and are adapted to allow the omni-modal circuit 1 to transmit voice communications over a cellular radio network.

FIG. 3 is a block schematic diagram of a personal communicator implemented through the use of the omni-modal circuit 1 shown in FIGS. 1A and 1B. As shown in FIG. 3, the personal communicator includes omni-modal circuit 1, personal communicator computing circuitry 302, telephone handset 318, and interface circuitry comprising data input 114, data output 116, and universal interface 158.

The personal communicator computing circuitry 302 includes display 304, microprocessor 306, memory 308, input device 316, data interface jack 310 and RJ-11 jack 312.

As can be seen in FIG. 3, the microprocessor 306 is connected to the display 304, the memory 308, the input device 316 and to the data interface jack 310 and RJ-11 jack 312.

The personal communicator computing circuitry 302 acts to allow the user to interface and process data in a manner known to those of skill in the art. For example, display 304 may include an LCD display panel and may be color or black and white. Microprocessor 306 may include an Intel 80×86 microprocessor or any other microprocessor manufactured by Intel or Motorola or other computer processing chip manufacturers. Memory 308 includes random access memory (RAM) and read-only memory (ROM) necessary for the functioning of the computing device. Input device 316 may be a keyboard or a pen-based interface or other interface including voice recognition that allows for data to be input to the personal communicator computing circuitry 302. Microprocessor 306 is interfaced through data interface jack 310 to data input 114 and data output 116 of the omni-modal circuit. This allows the personal communicator computing circuitry 302 to transmit data using the omni-modal circuit 1. Also, as seen in FIG. 3, microprocessor 306 is connected through universal interface 158 to microprocessor 110 in the omni-modal circuit 1. This permits the microprocessors 306 and 110 to exchange control and operating information with each other. Should the microprocessor desire to make a data call, microprocessor 306 can instruct the microprocessor 110 shown in FIG. 1B of the omni-modal circuit 1 to initiate a data call through a designated service provider. In response to such command from microprocessor 306, microprocessor 110 shown in FIG. 1B may initiate a switching action and configure the omni-modal circuit 1 to transmit data over a selected service provider. To increase the flexibility of the personal communicator computing device, an RJ-11 jack 312 is included. The RJ-11 jack is connected to the data lines from the microprocessor 306 and allows the personal communicator computing device to transmit data over a standard landline telephone.

In one particularly preferred embodiment of the invention, the omni-modal circuit 1 can transmit data over a landline telephone line using RJ-11 jack 312 and modem 124 shown in FIG. 1B. The microprocessor 306 of the personal communicator computing device would transmit data through data interface jack 310 and data input 114 to the omni-modal circuit 1. The omni-modal circuit 1, would receive the data at the data processing circuitry 118 and transmit the data through data output 150 and modem input 156 to modem 124 shown in FIG. 1B. Modem 124 would then modulate the data onto a voice grade channel and transmit the modulated data signal on modem output 154 through switch 120 and data input 152 to data processing circuitry 118. The data processing unit may then transmit the data over data output 116 and into microprocessor 306 through interface jack 310 shown in FIG. 3. The microprocessor 306 may then route the data through auxiliary data output line 314 to RJ-11 jack 312. In this manner, the personal communicator computing circuitry 302 is able to send data over standard landline telephone lines without the use of a second additional modem. The modem in the omni-modal circuit 1 serves two functions allowing the personal communicator user to send data through his standard landline wall jack or over a wireless network depending on the availability of each at the time the user desires to send the data.

Also shown in FIG. 3 is handset 318. In the preferred embodiment of the personal communicator, the speaker 100 and microphone 102 would be embodied in a separate handset 318. This handset 318 would connect to the omni-modal circuit 1 through an appropriate interface connection.

FIGS. 4A and 4B depict a communication device 402 employing the omni-modal circuit 1 of the present invention, and having an integrated display device for conveying information to a user. FIG. 4A shows the front of the communication device 402 that could serve as a cellular phone. The device 402 includes speaker 100, antenna 2, microphone 102 and key pad buttons 406. In this regard, the external features of the device are similar to those of a standard commercially available cellular phone. As shown in FIG. 4B, the device is unique in that it incorporates an expanded display 404 and control buttons 408, 410, 412 for the display of information to the user. For example, the display 404 could convey airline flight information to the user while they are connected with an airline representative. In response to a user request, the airline representative could transmit flight information to the user's communication device 402, which would then display this information on the display 404. The user could then cycle through the information using increment button 408 and decrement button 410. When the user desired to select a given flight, they could indicate assent by pressing the enter button 412. This information would then be transmitted digitally to the airline representative's computer.

The capabilities of the omni-modal circuit 1 facilitate its use in a device as shown in FIGS. 4A and 4B. Since the device is programmable through the use of microprocessor 110 and memory 112 (FIG. 1B), it is capable of switching between voice and data modes of operation. This allows the user to conduct a voice conversation and then to receive data for display on the integrated display device. Alternatively, the omni-modal circuit could access another communication service to receive data for display, or it might receive data over a subchannel during the conversation. This would be particularly advantageous if the user desired to continue a voice call while continuing to receive data information, as in the case of the airline flight selection example given above.

Figure 5:
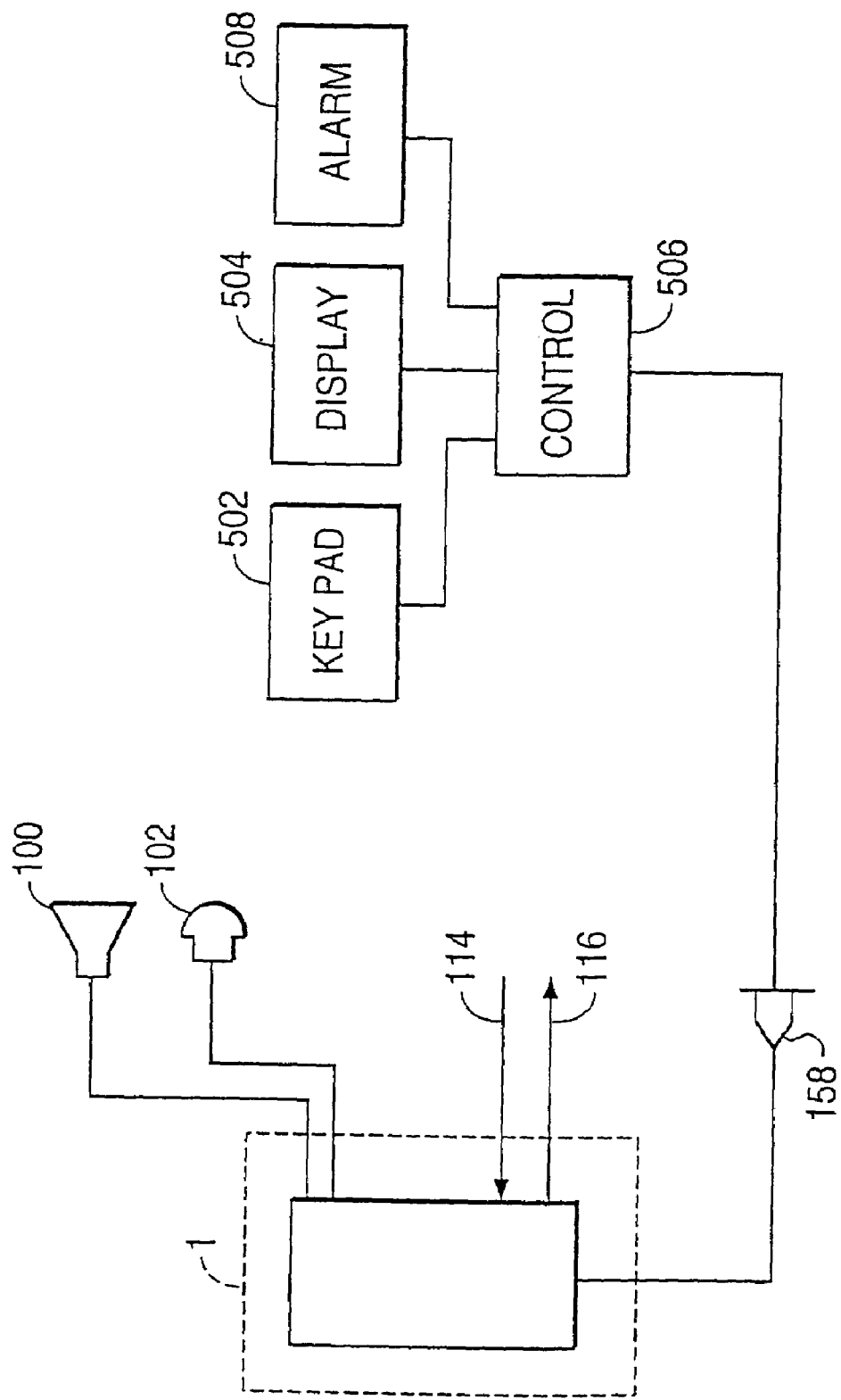
FIG. 5 is a block schematic diagram of a telephone/pager implemented using the present omni-modal radio communications circuit.

Referring next to FIG. 5, a block schematic diagram of a telephone/pager device using the omni-modal circuit 1 is shown. As can be seen from FIG. 5, the telephone/page device includes keypad 502, display 504 and control circuitry 506. The keypad 502 is connected to control circuitry 506. Display 504 is also connected to control circuitry 506. Control circuitry 506 is further connected through universal digital input/output interface 158 to the microprocessor 110 of the omni-modal circuit shown in FIG. 1B.

The combination telephone/pager device shown in FIG. 5 is generally similar in design to the advanced cellular telephone shown in FIG. 2. One particularly advantageous aspect of the omni-modal circuit 1 is its ability to provide a great degree of flexibility in the design and implementation of communication circuits. For different implementations external to the omni-modal circuit, the memory 112 shown in FIG. 1B can be reprogrammed to provide different functions through microprocessor 110 for the universal digital interface 158.

In FIG. 5, the telephone/pager implementation includes control circuitry 506 which receives information through the universal digital interface 158 from microprocessor 110. The control circuitry can then determine whether or not a page signal has been received by the omni-modal circuit 1 and if so it can display the appropriate information on display 504. If, however, control circuitry 506 receives information from microprocessor 110 that a telephone call has been received or is being used, then control circuitry 506 can appropriately display the telephone information on display 504. Similarly, control circuitry 506 can receive information from keypad 502 and selectively process this information depending on the current mode of operation. For example, if the device shown in FIG. 5 is in pager mode, control circuitry 506 may allow keypad input to cycle through stored paging messages. If however, the device shown in FIG. 5 is in telephone mode, control circuitry 506 may process the keypad information received from keypad 502 as telephone commands and transmit control signals through interface 158 to microprocessor 110 to cause a telephone call to be placed. Further, control circuitry 506 can actuate alarm 508 which may be a audible alarm such as a beeping or a vibration generator. Alarm 508 serves to notify the user when a telephone call or page is received.

Figure 6A:
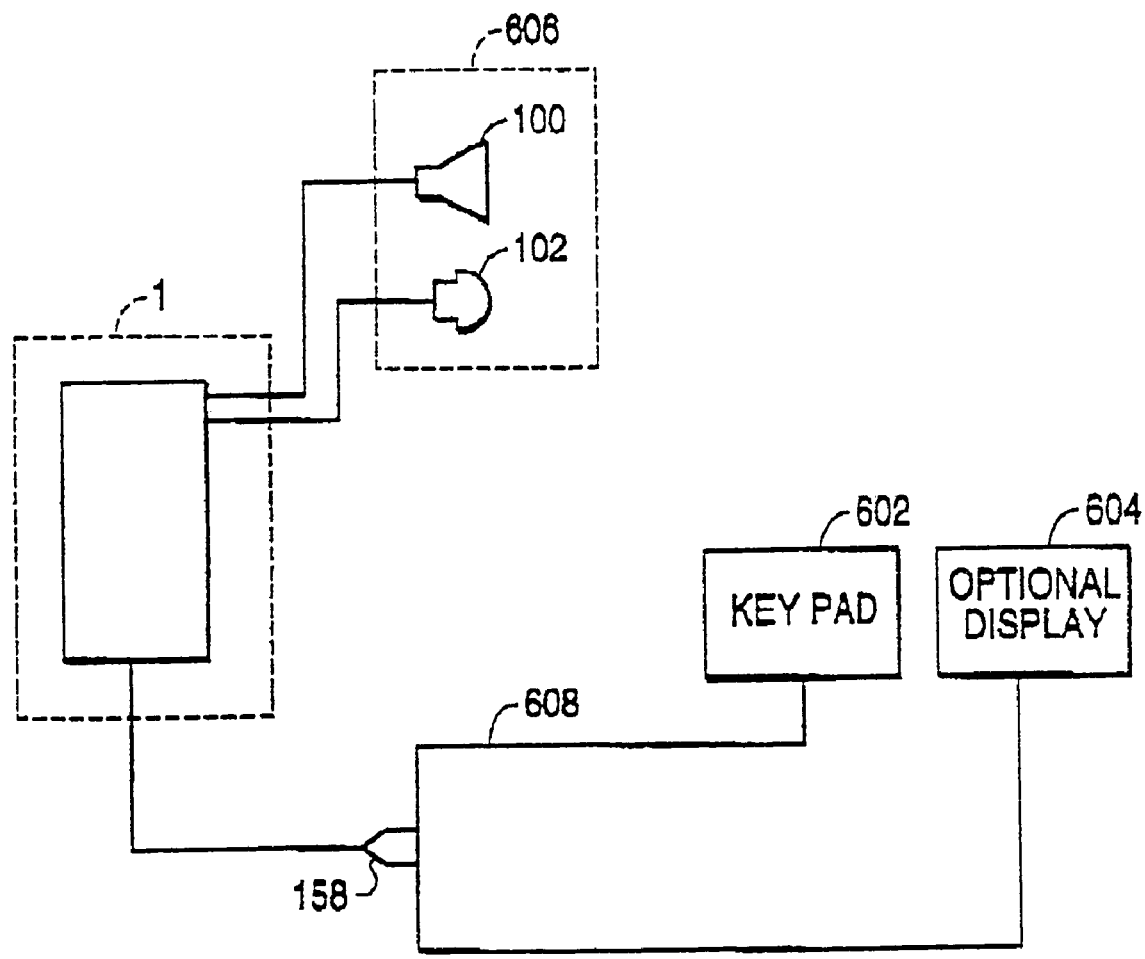
FIG. 6A is a block schematic diagram of a dual mode cellular/cordless landline telephone implemented using the present omni-modal radio communications circuit.

FIG. 6A is a block schematic diagram of a dual mode cellular/cordless landline telephone is disclosed. The dual mode device includes key pad 602, optional display 604, handset 606, and interface connector 608. The key pad 602 and optional display 604 are connected to microprocessor 110 (FIG. 1B) through interface connector 608 and universal digital interface 158.

Key pad 602 allows a user to provide information to microprocessor 110 for operating the dual mode device. For example, the user may operate the key pad to indicate that a certain call should be made on the cordless telephone network and not on the cellular network. To the contrary, the user may specify that the cellular network was to be used by operating the key pad 602 to so indicate.

One particularly preferred embodiment of a dual mode device may be programmed to allow for automatic selection of either a cellular communications network or a cordless telephone landline network. This is particularly advantageous in that a cordless telephone landline network is often considerably cheaper to access than is a cellular telephone network. Therefore, if the device will automatically access a cordless telephone network whenever one available, and use the cellular network only we absolutely necessary, the user can achieve substantial savings while still having a single, portable, communications unit that operates over a large geographic area. If the user requests service while within his home, for example, the cordless telephone system would be used and the user would be charged a minimal amount. If the user were to place a call while away from his home a greater charge would be incurred. The user, however, would use the same communications equipment regardless of where the service was used, and the service selection would appear transparent to the user.

Figure 6B:
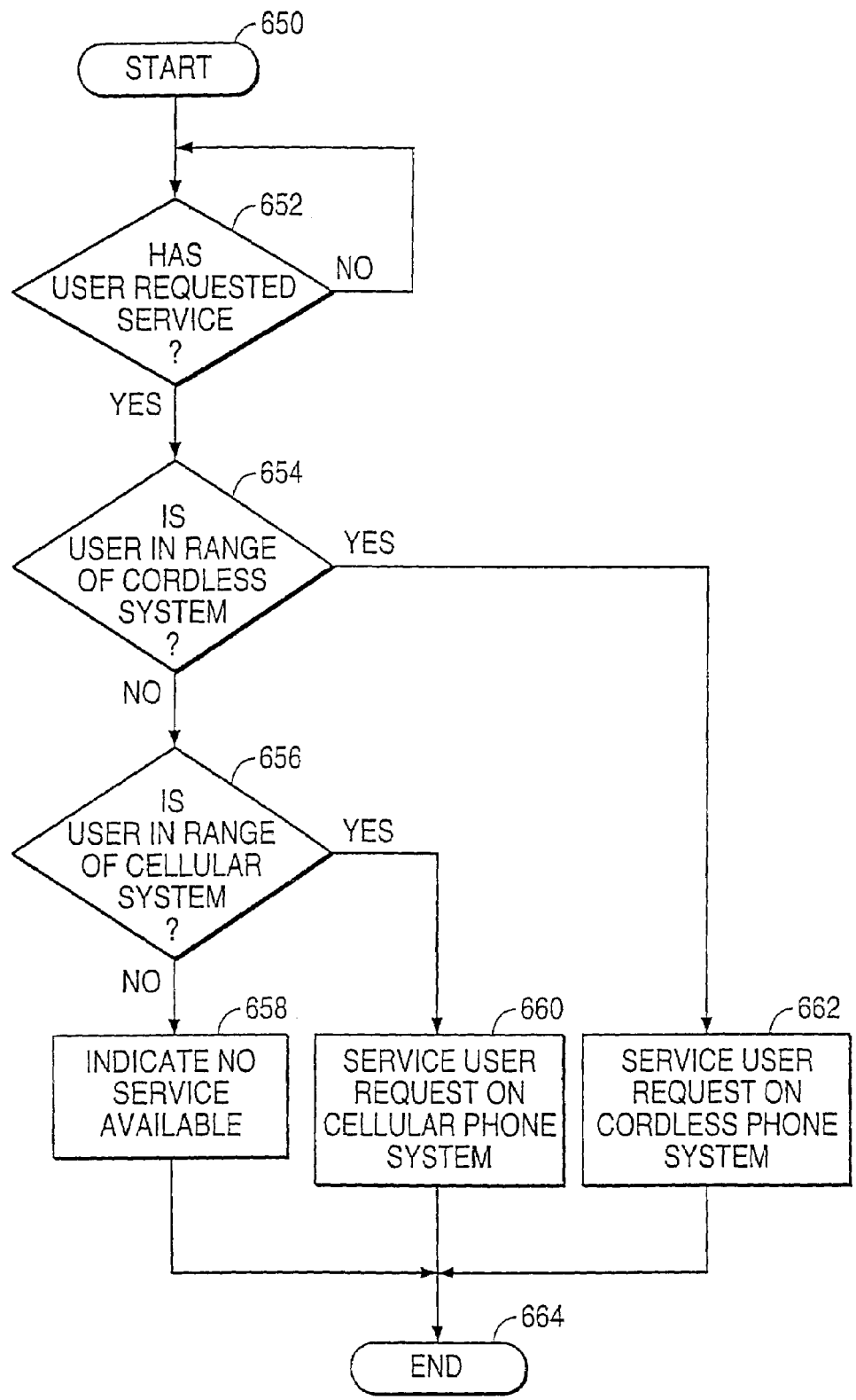
FIG. 6B is a flowchart showing a method of operation of a dual mode cellular/cordless landline telephone according to the present invention.

FIG. 6B is a flowchart of one method that may be used to implement this embodiment. The process of FIG. 6B begins 650 by determining if the user has activated the device to request communications services 652. If the user has not requested communication services, the devices continues to check for a user request. If a user request is detected, the device then determines if it is within range of a cordless telephone landline system 654. If the device is within range of a cordless telephone landline system, then the device services the user's request using the cordless landline communication system 662 and the process terminates 664. If the device is not within range of a cordless landline network, then the device determines if it is within the service range of a cellular phone system 656. If the device is within range, the user's request is serviced using the cellular phone system 660 and the process terminates 664. If the device is not within range of a cellular system, then the device issues an alert to the user to indicate that no service is available 658 and the process terminates 664.

Although FIG. 6A and the above discussion focus on a dual mode cellular/cordless landline telephone, it should be understood that the a device in accordance with the present invention may include the ability to access additional communication systems. For example, it may be desirable to have a device substantially as shown in FIG. 6A, but having the ability to access a personal communication service (PCS) network in addition to the cellular and cordless landline systems. This would allow the user to achieve further cost savings while seamlessly moving throughout a given geographic area.

Figure 7:
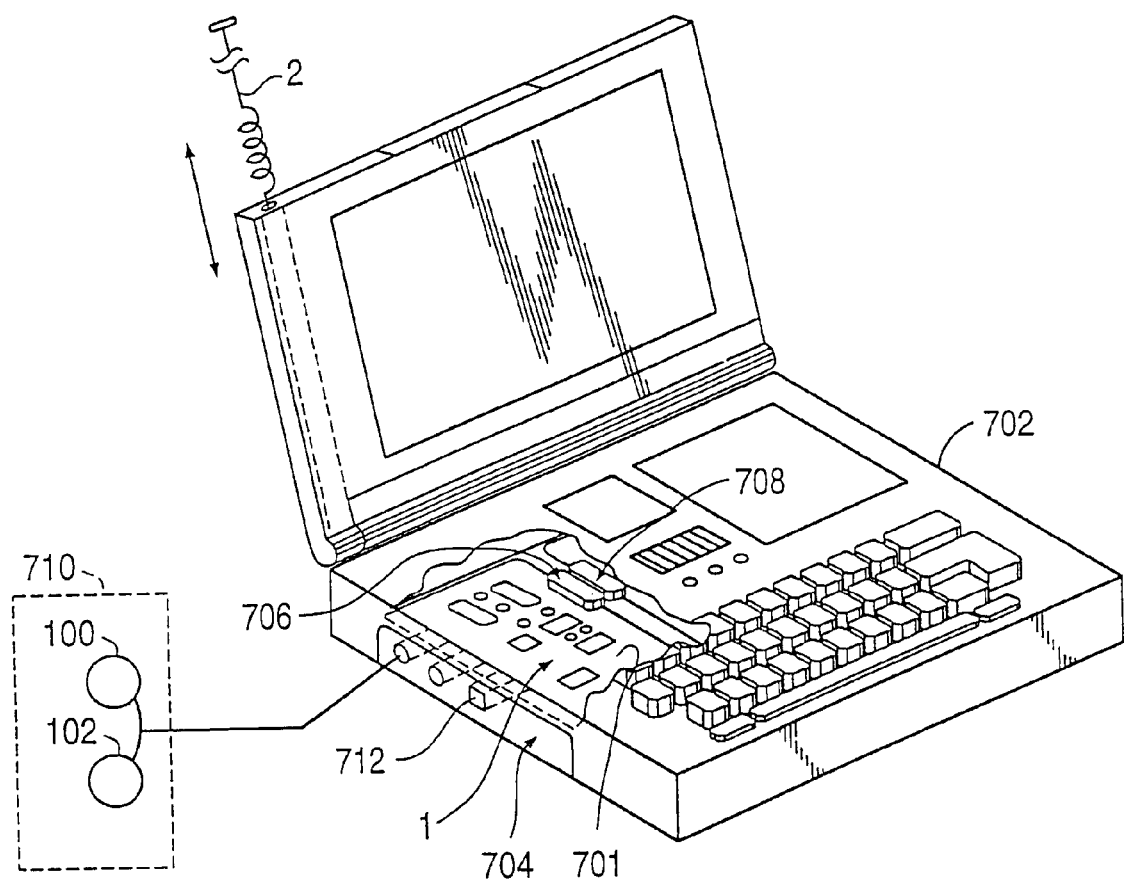
FIG. 7 is a block schematic diagram of a personal computer incorporating an omni-modal radio communications circuit.

Referring next to FIG. 7, a block schematic diagram of a personal computer 702 incorporating an omni-modal circuit 1 is shown. As can be seen in FIG. 7, computer 702 includes antennae 2 and an interface port 704 that allows for a integrated circuit card to be inserted into the computer. As shown in FIG. 7, the interface port 704 has installed therein a removable card 701 comprising an omni-modal circuit 1. The omni-modal radio communications card 701 includes connector 706, which may include data input 114, data output 116 and universal digital interface 158 shown in FIG. 1B. This connector allows the omni-modal radio interface card 701 to communicate with the computer through a corresponding mating connector 708 inside the personal communicator. This allows the microprocessor 110 on the omni-modal radio communications card 701 to communicate with the memory and microprocessor contained in the computer 702. In a preferred embodiment, the omni-modal radio communications card 701 is in the form of a PCMCIA card adapted to interface into a standard slot in a portable or other computing device. FIG. 7 also shows an optional telephone handset 710 which may be interfaced to the radio communication interface card 701. Optional handset 710 includes speaker 100 and microphone 102, and serves to allow for voice communication over radio network service providers that provide such capability.

The omni-modal radio communication card 701 also has an external RJ-11 data jack 712. The external RJ-11 data jack 712 allows omni-modal communications card 701 to transmit data over a telephone landline circuit using a common RJ-11 interface cable. Omni-modal communications card 701 includes a modem 124 in FIG. 1B for modulating digital data onto a voice grade channel suitable for transmission over a landline telephone connection.

Therefore, the radio communications card 701 serves as a modem to the personal computer and a separate modem card or external modem is not necessary in order to transmit data over a landline jack. The microprocessor 110 in the omni-modal circuit card 701 allows the circuitry to select either landline transmission via external RJ-11 jack 712 or cellular radio transmission through antennae 2. This may be accomplished for example through an analog switch circuit as disclosed in U.S. Pat. No. 4,972,457, the disclosure of which is incorporated herein by reference.

Figure 8:
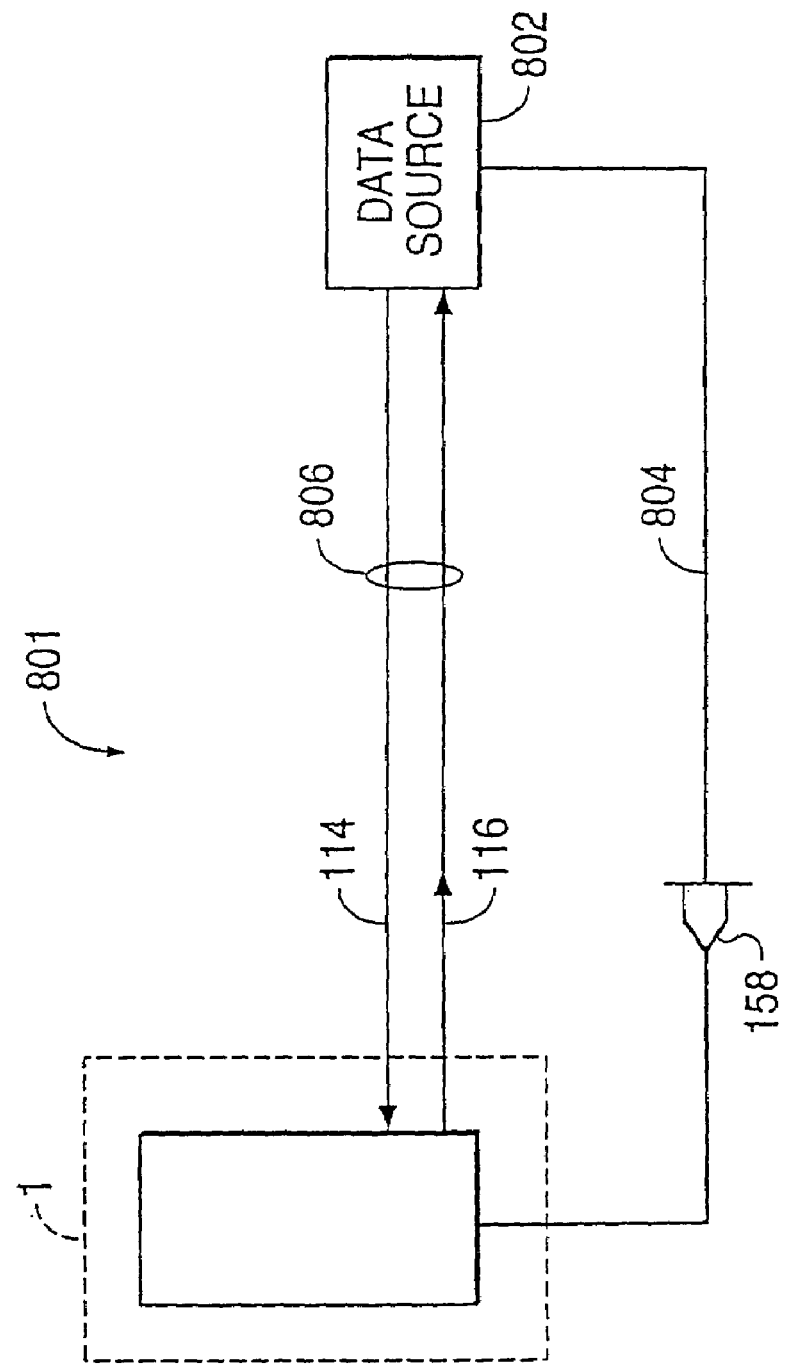
FIG. 8 is a block schematic diagram of a special purpose radio data transmitting device implemented using an omni-modal radio communications circuit.

FIG. 8 is a block schematic diagram of a special purpose radio data transmitting device 801 that is implemented using the omni-modal circuit. It is often desirable to be able to construct a device that will be capable of operating to send data wirelessly. For example, it may be desirable to include such a device in a vending machine or gasoline pump. Device 801 may then relay data at a predetermined time concerning the amount of consumables (e.g. food, beverages, gasoline, etc.) still remaining in stock. In this manner, it is not necessary to have a person physically inspect the device and evaluate the remaining stock, which would be considerably more expensive.

The omni-modal circuit 1 of the present invention can be used to implement a system as described above. Referring to FIG. 8, the omni-modal circuit 1 is connected to a data source 802 through data lines 806 comprising data input line 114 and data output line 116. Additionally, microprocessor 110 (FIG. 1B) is connected to the data source through universal digital interface 158 and control line 804. The resulting omni-modal device 801 can be programmed to access a selected communications service at a periodic interval and to transmit data from the data source at that time. This function can be included in the library of functions available on circuit 1. After accessing the communications service, microprocessor 110 may instruct data source 802 using control line 804 to transmit data over data lines 806. Of course, the omni-modal device 801 will have the circuits necessary to use a plurality of different transmission networks. However, because of mass production and the availability of predetermined designs it may be desirable to use the standard building block circuit 1 to implement limited-purpose devices which will be used with only one or two systems, even though these limited purpose devices will use only a portion of the built-in capabilities of circuit 1.

In addition to functions directly related to radio communications and modulation, the library may desirably include other functions which enable desirable computing features. For example, data displaying, electronic mail storage, retrieval, and composition, and other computing functions may be included in the library. In addition, if a high powered processor is provided, the library may be expanded to include substantial operating system functions so that circuit 1 can be used to construct full-fledged personal computers and personal communicators capable of running third party applications programs.

Figure 9:
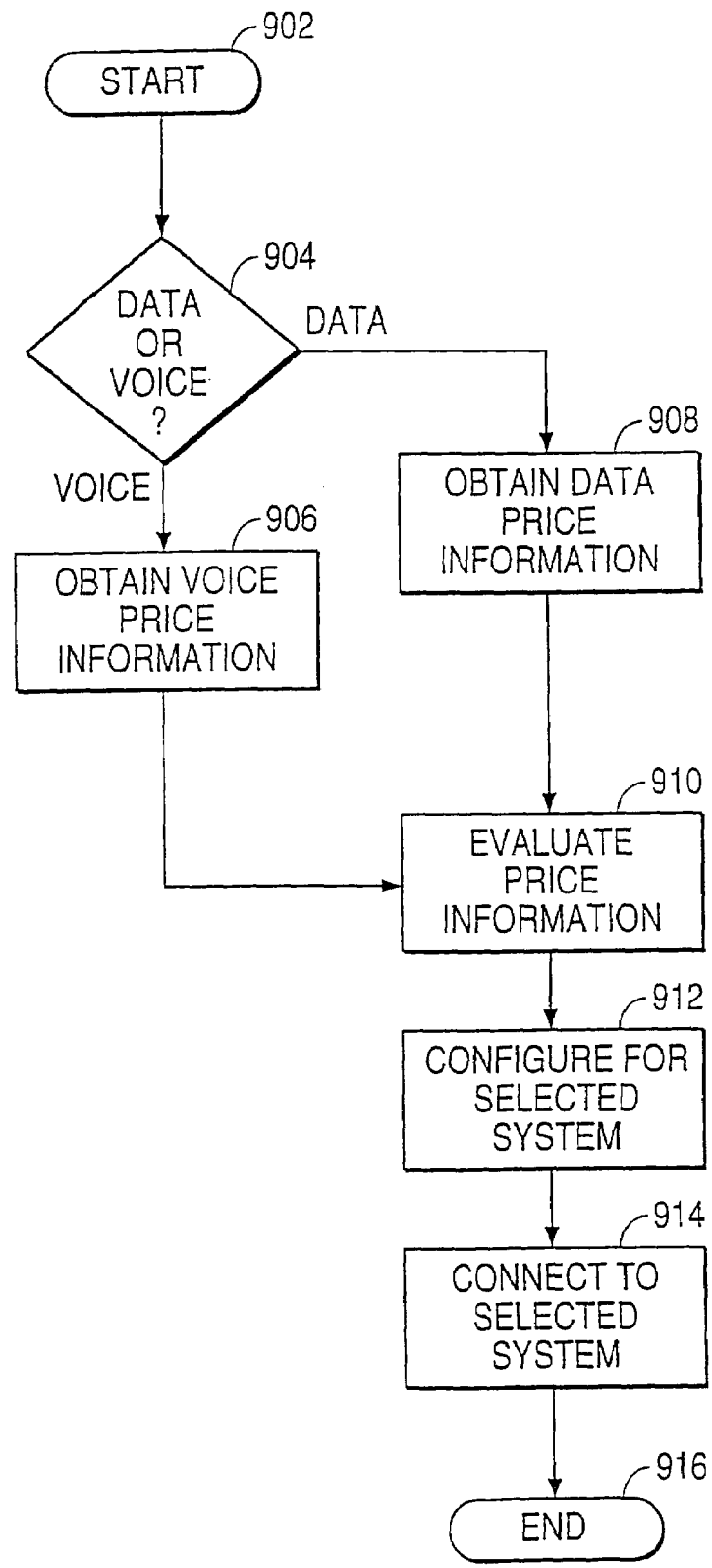
FIG. 9 is a flowchart showing a radio system selection method by which information carriers are selected according to varying specified criteria.

As described above, circuit 1 will be capable of utilizing any one of the wireless data services within a given geographic area. The selection of the service to be used can be made manually by the user, or can be selected automatically. Referring to FIG. 9, circuit 1 may have a preprogrammed routine for selecting information carriers based on varying criteria. As shown in FIG. 9, the criteria for selecting a carrier may be varied by the user. Possible criteria include the cost of sending a data message; quality of transmission link (signal strength, interference actual or potential); available bandwidth on a carrier for data transmission (or transmission speed supported); potential for being bumped off the system or having transmissions delayed (that is, is the service provider at nearly full capacity); security of transmission; or other special criteria which the user or the device may establish based on the user's individual priorities. As another example, the length of a data message to be transmitted may be considered as a factor in selecting the carrier. If the length of the proposed message is made known to circuit 1, this information can be used in conjunction with pricing information to determine the lowest cost route. For example, for very short messages a paging service or cellular digital packet data (CDPD) service might be selected. For longer messages, such as fax or data file transmission, a circuit switched connection with high speed data transfer capacity (such as AMPS cellular) may be more cost-effective.

Information about the costs and services offered by carriers in the area will be made available to the omni-modal circuit 1 for use in this competitive selection process, either through pre-programming by the user or selling organization or by transmission of the information in a manner described elsewhere herein.

The carrier may be selected by any one of the characteristics of the available competing carriers. For example, a given user may be price sensitive, and wish to always employ the lowest cost transmission method. Another user may have time-critical communications needs (e.g. securities trading or news reporting) and may prefer the most reliable or the highest speed transfer regardless of price.

In determining the cost of a particular transmission, circuit 1 preferably first determines the type and quantity of data to be transmitted. For example, if the user has selected a function of transmitting a file or an electronic mail message, circuit 1 will determine the length of the message and file. This information is then used in determining the projected cost of transmitting the data on each system. For example, for a short E-mail message, the expected cost for an AMPS cellular system will be the cost of making a one-minute call. For a packet radio system, the expected cost will be the length of the message divided by the number of characters per packet, times the cost per packet. As long as the basis for carrier charges is provided to circuit 1, the cost factors relevant for any particular message can be calculated. Thus, circuit 1 can intelligently predict relative costs of transmitting over various networks and can operate with a low-cost preference dependent on characteristics of an individual message. Different low-cost transmission modes are appropriately selected for messages having different characteristics.

A more sophisticated approach than pure low-cost selection allows the user to assign weights to different competitive factors (price, signal clarity, transmission speed or other factors) depending on the individual preferences and needs of the user. Based on the assigned weights, the circuit then calculates a "score" for each available system and selects the system with the highest score. As an example, a user may instruct the circuit to select carriers based 60% on the ratio of the lowest price to the price of the particular carrier and 40% on normalized signal strength. If the cost to send the message on System I is $0.50 (signal strength 2), the cost on System II is $0.60 (signal strength 4), the cost on System III is $0.85 (signal strength 5) and the cost on System IV is $0.50 (signal strength 1) circuit 1 would calculate scores of:

$$0.60(0.50/0.50)+0.40(2/5)=0.76 \quad \text{System I}$$

$$0.60(0.50/0.60)+0.40(4/5)=0.82 \quad \text{System II}$$

$$0.60(0.50/0.85)+0.40(5/5)=0.75 \quad \text{System III}$$

$$0.60(0.50/0.50)+0.40(1/5)=0.68 \quad \text{System IV}$$

so System II would be selected. With the same systems available, if the user preferred a selection based 80% on cost and only 20% on signal quality, the scores would be $$0.80(0.50/0.50)+0.20(2/5)=0.88 \quad \text{System I}$$

$$0.80(0.50/0.60)+0.20(4/5)=0.83 \quad \text{System II}$$

$$0.80(0.50/0.85)+0.20(5/5)=0.67 \quad \text{System III}$$

$$0.80(0.50/0.50)+0.20(1/5)=0.84 \quad \text{System IV}$$

and System I would be selected. Of course, the application of this weighted selection criteria is not limited to, and is not necessarily based on, price and signal strength. Any number of criteria, including these or others, can be considered in a formula to meet the individual user's needs. The criteria for a particular user are stored in a user profile in the memory of circuit 1. Preferably, a default user profile corresponding to the preferences of a large number of users is established. Then, the individual user can change his or her user profile to establish different selection parameters and preferences at any time through appropriate input to circuit 1.

Particularly desirable selection algorithms may also take multiple factors into account by employing branching algorithms to select the carrier. For example, one multistage selection process based on multiple criteria would operate as follows. Initially, systems which are incapable of performing the desired function would be eliminated from consideration. For example, if the user wants to place a voice call, data-only systems would not be considered. As another example, if the user wants to send a fax to a customer and a given network has no capability of transmitting fax information to a specified telephone number, that system would not be considered for the proposed task. Next, among the systems available, circuit 1 may predict the lowest cost route based on a formula accounting for the message length and the costs of the available systems, including consideration of any long-distance surcharges implied by the destination of the information transfer. Finally, users may also prefer that circuit 1 automatically avoid selecting carriers which are suffering performance degradations because of capacity limits, or which have a particularly weak signal at the location of the user. In this way, if the carrier which would otherwise be preferred will not be able to provide a fast, accurate information transfer at the time from the user's location, the carrier that is the "next best" according to the primary programmed selection criteria (cost in this example) may be automatically selected. A tradeoff between signal quality and cost may also be arbitrated by the weighting method described above.

Preferably, any one or combination of the above selection criteria is available in the circuit 1 and the selection criteria can be selected, programmed, changed or overridden by the user. Adaptive service provider selection may be implemented based on user experience. That is, the information transmission track record of circuit 1 with a particular service provider (e.g. error rate, dropped connections, transmission time) can be stored and updated, and this information can be used as a weighted factor in selecting service providers. In this way, service providers providing poor services can be avoided in cases where more desirable alternatives are available.

The market and consumer implications of the present invention are substantial, in that the circuits and methods of the present invention tend to introduce intense competition for customers among various wireless carriers. The present invention automatically identifies service providers that best meet the user's performance requirements. In this way, service providers that meet the varying demands of the most user will have a large market share and maintain full usage of their available frequency spectrum. The invention therefore allows the users to drive the market by creating price and service competition among carriers.

In addition, the omni-modal capability of the present invention facilitates a free market for the use of frequency spectrum. Circuit 1 can be activated to select a specified channel frequency, but may be activated to use command, control, and data protocols on that channel that are normally appropriate for different channels, if the carrier controlling the frequency has authorized another carrier to temporarily use the first carrier's channel. As an example, a local AMPS cellular telephone carrier may have open channels, which may be temporarily "rented" to a Specialized Mobile Radio (SMR) carrier which is experiencing heavy traffic on its assigned channels. The SMR carrier may then direct persons requesting SMR service to operate on the "rented" channel, but using SMR protocols rather than the AMPS protocols which would normally be appropriate to that channel. This method of operation maximizes the efficient use of available frequencies by allowing carriers to shrink and expand the number of channels available based on current demand. During rush hours, when AMPS traffic is high, additional channels might be reallocated to AMPS by market forces; that is, the AMPS carrier will rent additional channels from under-utilized carriers to provide the services desired by the public at that time. At other times, demand for other systems may increase, and AMPS or other carriers may rent their under-utilized bandwidth to carriers having a substantial demand. This might occur, for example, if a network providing status reporting services from remotely located equipment (vending machines, gas pumps, etc.) is designed to transmit a large volume of data during late night or early morning hours. If the remotely located equipment is provided with an omni-tunable device, the status report network can rent channels from other carriers and use multiple channels to service its customers. In this way, economic incentives are established to ensure that airwave channels are assigned to their most productive use at all times, and the anti-competitive effects of carrier monopolies established by FCC channel assignments are reduced.

Referring to FIG. 9, one method for evaluating system selection is shown. The process begins 902 with the determination by the omni-modal circuit 1 of whether a data of voice service is desired 904. If a data service is desired, the circuit 1 obtains price information 908 for the available data service providers. If a voice service is desired, the circuit 1 obtains voice pricing information 906. Once this pricing information is obtained, the circuit 1 evaluates the information to make a service provider selection based on the criteria supplied from the user. Once this selection is made, circuit 1 is configured for accessing the selected service provider 912 and establishes a connection with that provider 914. Once the user has completed his use of the selected service provider, the process ends 916.

Figure 10:
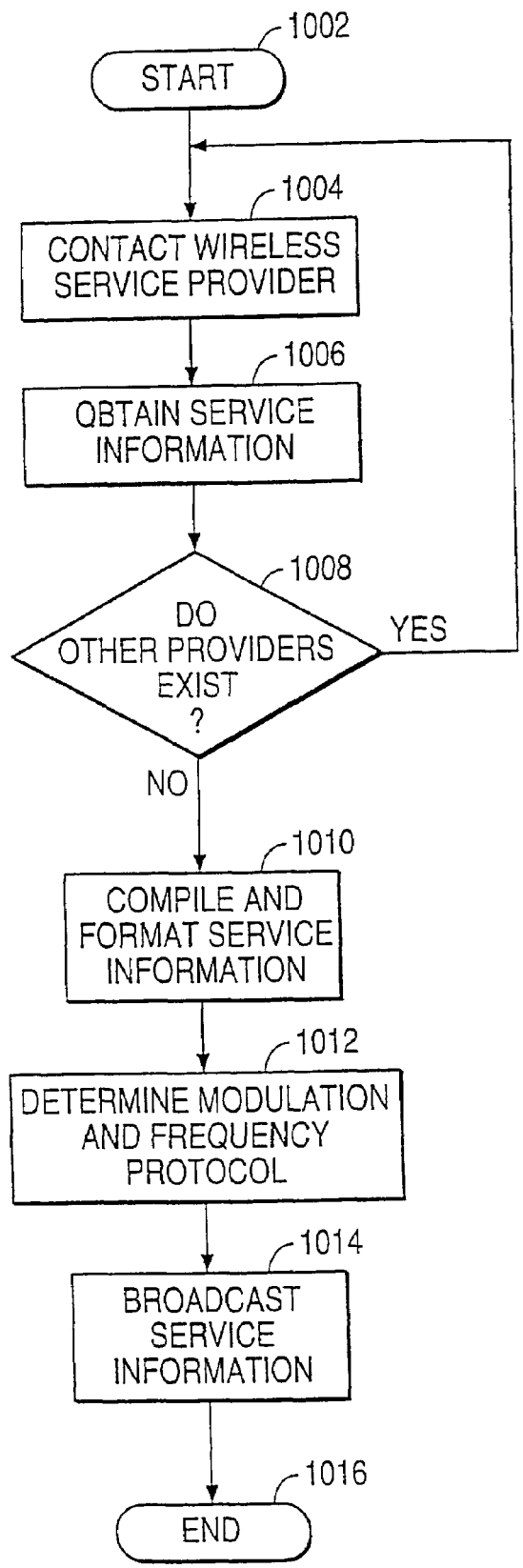
FIG. 10 is a flowchart showing a method of broadcasting local carrier information to facilitate carrier selection by customers for a particular information transmission task.

FIG. 10 is a flowchart showing steps useful in a method according to the present invention for "advertising" available carrier services in a geographic area. In this method, wireless service providers broadcast electronically, as part of any "handshaking" procedure with an omni-modal product, information such as rate information, information specifying system operating characteristics such as system utilization, the likelihood of being dropped, and other factors noted above which may be desirably considered in carrier selection. This information may be broadcast in each geographical region by a jointly operated or government-operated transmitter operating at a predetermined frequency. Circuit 1 may then be operated to scan the predetermined "service advertising" channel and obtain necessary information for use in selecting carriers. On a government-operated channel, government-collected statistics on the operation of the various carriers in the area may be transmitted as a consumer service to further encourage service competition and assist users in selecting the most appropriate carrier.

Alternatively, individual carriers may broadcast pricing information on individual command channels. Pricing can be changed on a dynamic basis to maintain a desired system load level. In fact, in one preferred embodiment, an automated price negotiation can be performed in which the circuit 1 transmits an indication of the type and amount of information which is to be transmitted, and the carrier responds by quoting a price for the transmission. Such quotes can be obtained from multiple carriers and the lowest cost transmission mode can be selected, or the quoted prices can be factored into an equation that considers other factors in addition to price, as disclosed previously. As part of this scheme, radio carriers may implement a dynamic demand curve evaluation program in which system load and profitability are constantly monitored. The evaluation program may also monitor the percentage of requested quotes which are not accepted. In this way, the radio carrier's system can dynamically adjust prices to maximize revenue to the carrier at all times, based on a real-time model of the current demand curve for airtime service in the area.

One method in which system information could be distributed to users is shown in FIG. 10. The process starts 1002 by contacting a selected service provider 1004. The service provider provides information to a central location as discussed above. Once the information for the first selected service provider is complete, the process determines if other service providers exist 1008. If other providers exist, the process 1004 and 1006 is repeated for each additional service provider. When service information is compiled for all service providers, the process compiles and formats the information into a standard reporting form the is understandable to all mobile units 1010. The process then determines the proper modulating frequency and protocol for the desired geographic area 1012 and broadcasts this information to all mobile users on the selected frequency and using the selected protocol 1014. Once the information has been broadcast to the users, the process ends 1016.

Figure 11:
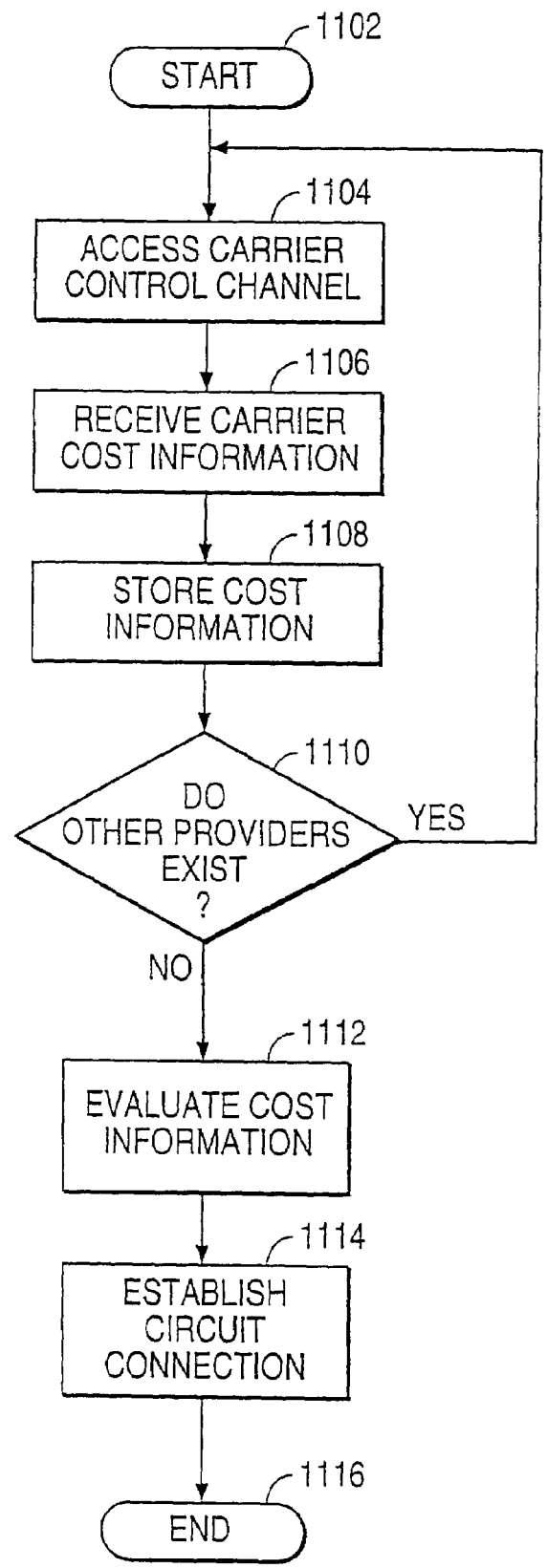
FIG. 11 is a flowchart showing a handshake sequence for arranging information transmission using the omni-modal device of the present invention.

Referring next to FIG. 11, a flowchart showing a handshake sequence for arranging information transmission using the omni-modal circuit 1 of the present invention is shown. The process begins 1102 with the omni-modal circuit 1 accessing a service provider 1104 and receiving carrier cost information from the service provider 1106. The omni-modal circuit 1 may also receive additional information from the service provider such as signal quality, system resources, and available bandwidth. The circuit 1 then stores the information received from the service provider 1108. The circuit determines if other service providers exist 1110 and, if they do, repeats the above steps to acquire cost and availability information for each service within the omni-modal circuit's range.

Once information has been acquired for all available service providers, the information is evaluated 1112. This evaluation could consist of a simple determination based on a single factor, or could include more complex calculations relating to weighting of given factors and qualities. The results of the evaluation are used to select a service provider to process the users pending request for services. A connection is established 1114 on the selected service provider, and the user's request is processed, after which the process ends 1116.

Figure 12:
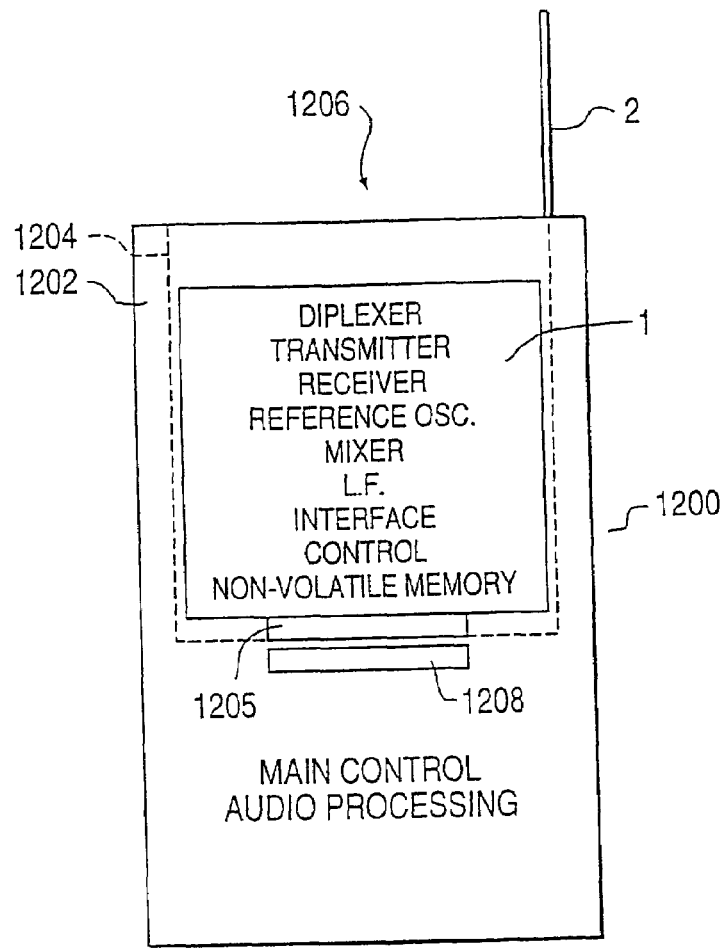
FIG. 12 is a plan view of a modular implementation of the omni-modal radio communications circuit of the present invention installed in a cellular telephone.

FIG. 12 is a view of a cellular radiotelephone 1200 which is generally of the type and configuration described above with reference to FIG. 2. However, radiotelephone 1200 is constructed using a modular omni-modal circuit 1 constructed on a removable card 1204 which is provided with a standardized connector or connector (for example, a PCM-CIA connector) 1205 to establish all necessary interface connections to a plurality of receiving devices in the manner described above with reference to FIG. 7.

As can be seen in FIG. 12, a telephone shell 1202 containing a battery power supply, microphone, speaker, keypad, and antenna 2 has a receiving slot 1206 for receiving card 1204 carrying circuit 1. When card 1204 is installed in telephone shell 1202, connector 1205 mates with connector 1208 within slot 1206 and the external components of the shell 1202 are operatively combined with card 1204 to create a functional multi-modal cellular telephone.

Figure 13:
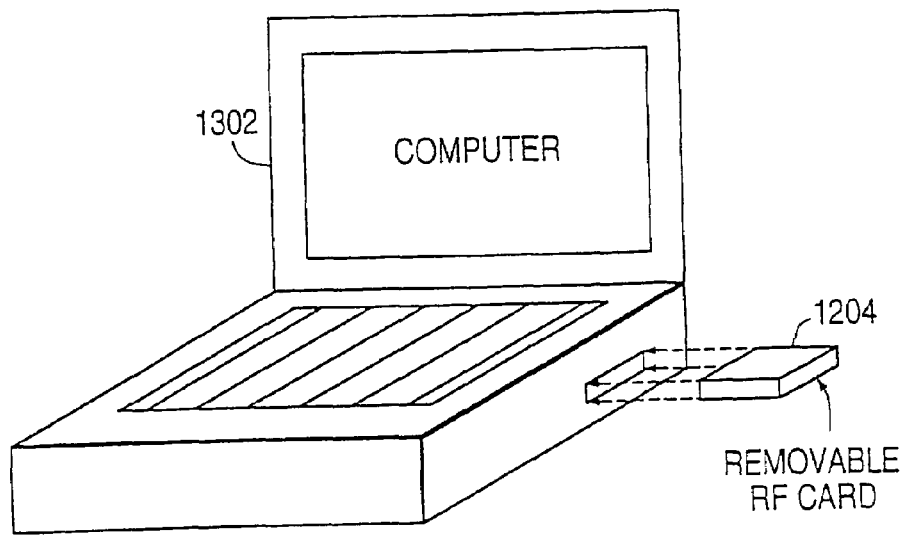
FIG. 13 is a plan view of a modular implementation of the omni-modal radio communications circuit of the present invention installed in a personal computer.

FIG. 13 illustrates the installation of the same card 1204 in a notebook sized computer 1302, whereby the computer 1302 is provided with complete omni-modal network access. By using the same card 1204 containing standardized circuit 1 to provide radio network access for various devices, the user can avoid maintaining multiple accounts or telephone numbers, yet can communicate by radio using many devices. For example, a receiving slot for card 1204 could be provided in the user's automobile, and insertion of card 1204 upon entering the car would activate cellular communications capability in the car. The same card 1204 can be readily transferred between the car, a portable handset shell as shown in FIG. 12, and a computer as shown in FIG. 13 for data transmission.

The omni-modal circuit of the present invention can perform both page receiving and other functions, such as placing cellular telephone calls. However, since only a single transmitting and receiving circuit is provided, when the device is in use on a non-paging communications network such as an AMPS cellular telephone system, any pages directed to the device may not be received. The present invention provides a solution to this potential problem in which the paging system control is interconnected with other network(s) such as the local AMPS cellular system. It should be understood that while connection of the pager system to the AMPS system is shown as an example, such connections may be provided between any systems used by the omni-modal circuit 1 to achieve similar objectives.

Figure 14:
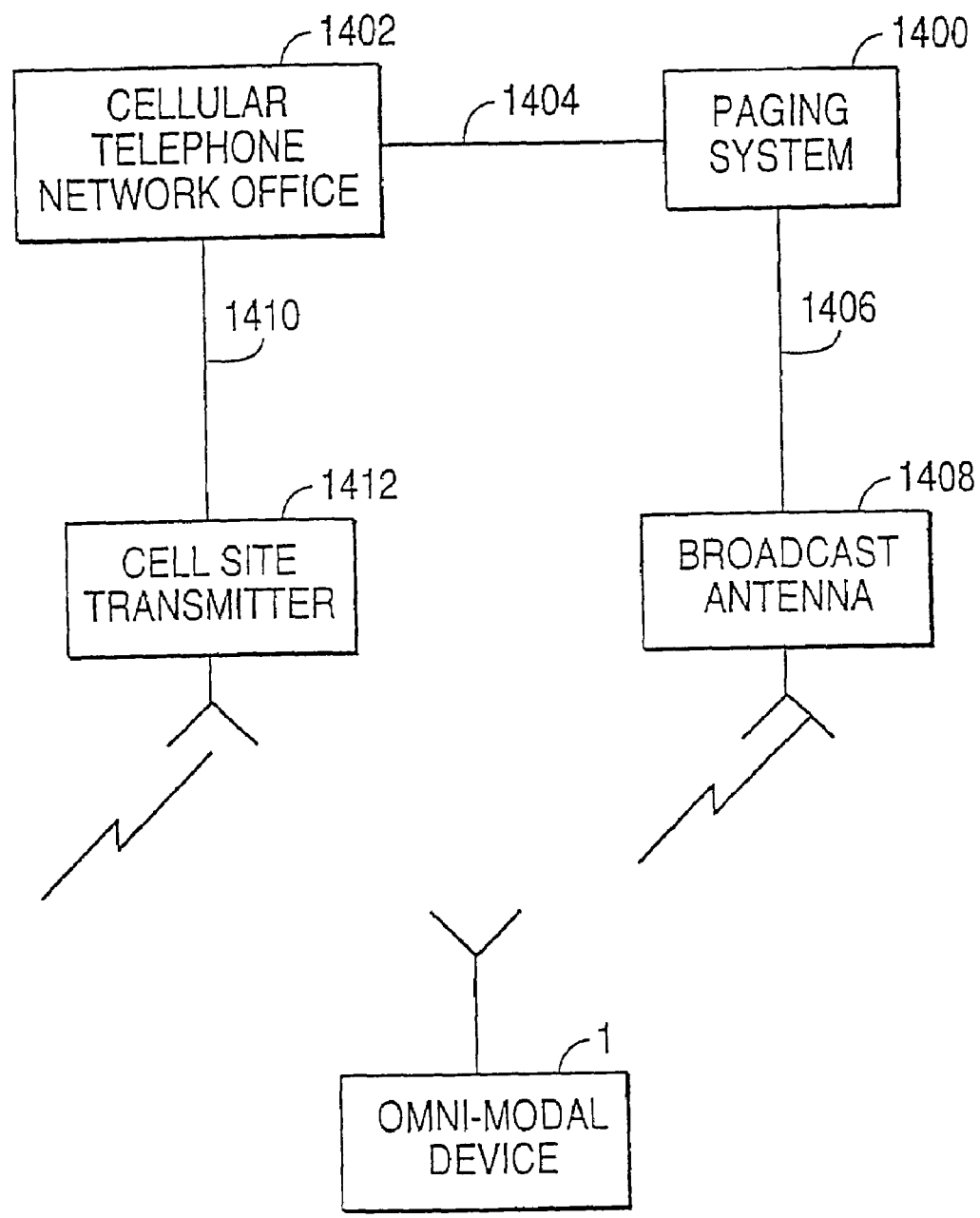
FIG. 14 is a block schematic diagram showing a system for relaying paging signals to the omni-modal device of the present invention using a cellular telephone system.

FIG. 14 is a block schematic diagram of a paging relay system according to the present invention for use with omni-modal circuits 1 that support pager functions and also a non-pager network function such as cellular telephone operation. FIG. 14 shows a paging system 1400 which is connected in a conventional manner by lines 1406 to a broadcast antenna 1408 which transmits pager signals to pager devices such as the omni-modal circuit 1 shown in the Figure. In addition, FIG. 14 shows a cellular telephone network office 1402 which is connected to control the operation of the cellular telephone cell site transmitter 1412 by lines 1410.

Significantly, the paging system 1400 is connected to the cellular telephone network office 1402 by lines 1404 which permit transfer of operational and control information between the paging system 1400 and cellular telephone network office 1402. Because of the connection of lines 1404, the paging system can determine whether the omni-modal device 1 is engaged in a cellular call and will thus be unable to receive a page.

FIG. 15 is a flowchart showing a preferred operation of the pager and other (for example AMPS) systems interconnected as described with reference to FIG. 14. In block 1502, the pager system first determines by reference to stored records whether the pager device which is to be contacted is an omni-modal circuit 1 which may be engaged in data transmission with another system at the time of any given page. If not, the page can be sent by the usual broadcast method in block 1504. If an omni-modal circuit 1 is involved in the paging operation, the pager system then contacts any connected networks which might be in use by omni-modal device 1 and inquires whether the device is in fact using such networks in block 1506. If not, the omni-modal device is presumed to be available for receiving a page and control transfers to block 1504 for transmission of the page by conventional methods. If circuit 1 is in use, the pager system determines whether delivery by the alternate network may be accomplished in block 1508. This may be determined by appropriate factors, including whether the network (e.g. AMPS) is capable of and willing to deliver the page information to circuit 1, and whether the user of circuit 1 has subscribed to this service.

If delivery by the alternate network is not available, control transfers to block 1510 which imposes a time delay. The page information is stored, and after some appropriate period of time, control transfers to block 1506 and the pager system again attempts to determine whether the page can be transmitted by conventional means.

If the alternative network is able to deliver the page and this service is to be provided, control transfers from block 1508 to block 1512 and the page is transmitted over the alternative system. In the case of the AMPS system, the page information may be transmitted as a momentary interruption in an ongoing conversation, as information provided on a command channel, as subaudible information (e.g. in a band from 0 to 300 Hz), or by another appropriate method.

We claim:

1. An advanced cellular telephone for facilitating voice and data communication over a plurality of wireless communication networks, at least one of which is a Personal Communication Services network operating in the PCS frequency band using a protocol for communication that is appropriate for the PCS network and at least one additional network operating either inside or outside of the PCS frequency band using a protocol for communication that is appropriate for the one additional network, comprising a housing small enough to form a portable handset;

an antenna supported by the housing for transmitting and receiving electromagnetic energy;

a display, supported by the housing, for displaying information that is visually perceptible to a user and that includes information procured, in response to a user request, from a remote computer with which the cellular telephone is linked wirelessly via one of the wireless communication networks;

a touch-sensitive device for receiving user supplied commands and data including said user requests for information; and an omni-modal communication circuit for accessing the wireless communication networks using a communications protocol appropriate to the wireless communication network accessed to establish a communication link for voice or data communication over the accessed network, the omni-modal communication circuit including a transceiver, electrically connected to the antenna, for sending and receiving radio frequency voice signals and data signals, digital modulator circuitry for modulating digital voice signals and digital data signals onto a carrier for transmitting by the transceiver in accordance with a communications protocol compatible with the PCS communication network when accessed and in accordance with a communications protocol compatible with the one additional network when accessed, digital demodulator circuitry for demodulating digital voice signals and digital data signals from radio frequency signals received by the transmitter in accordance with the communications protocol compatible with the PCS communication network when accessed and in accordance with the communications protocol compatible with the one additional network when accessed, memory for storing an operating program and data including network information, telephone numbers and text messages, and a processor for setting up appropriate cross connections between the display, memory, touch-sensitive device, digital modulator circuitry and digital demodulator circuitry and transceiver to cause the transceiver to access the plurality of wireless communication networks, one or more at a time, including the PCS network and the one additional network, for sending and receiving both voice signals and data signals over the accessed network and to receive user commands, to provide information to the display, to carry out arithmetic calculations, to request information from remote computers and to retrieve data from memory;

wherein the functions of information retrieval from remote computers, data processing and placing or receiving telephone calls may be carried out by selective access, under the control of the processor, to the plurality of wireless communication networks including the PCS network and the one additional network through operation of the omni-modal communication circuit.

2. An advanced cellular telephone as defined in claim 1, said touch sensitive device further includes an incrementing button and a decrementing button to cause the information displayed on said display to scroll up and scroll down, respectively, when actuated by the user.

3. An advanced cellular telephone as defined in claim 1, wherein said processor includes a microprocessor, operating under the operating program, to selectively set up the cross connections and a data processing circuit for formatting data as required for devices sending data to and receiving data from the omni-modal communication circuit.

4. An advanced cellular telephone as defined in claim 1, wherein said
transceiver includes a local oscillator,
a receive mixer connected to the local oscillator,
an amplifier,
a transmit mixer connected to the local oscillator and to the amplifier, and
a diplexer connected to the amplifier, to the receive mixer and to the antenna.

5. A multi-modal device for facilitating wireless communication over any one of a plurality of wireless communication networks operating pursuant to differing transmission protocols and/or over differing radio frequencies, comprising:

a frequency agile radio transceiver adapted to operate at a radio frequency appropriate for each of the plurality of wireless communication networks as determined by a frequency control signal;

a digital interface circuit for interconnecting said frequency agile radio transceiver with external devices to allow information to be sent and received over said frequency agile radio transceiver;

protocol agile operating circuit means for operating said frequency agile radio transceiver and said digital interface circuit in accordance with one of the transmission protocols as determined by a protocol control signal; and adaptive control means for accessing a selected wireless communication network and for generating the frequency control signal and the protocol control signal in response to a user defined criteria to cause the device to communicate with the selected wireless communication network using the frequency determined by the frequency control signal and the protocol determined by the protocol control signal.

6. The multi-modal device of claim 5, wherein said adaptive control means selects the wireless communication network based on the least cost.

7. The multi-modal device of claim 5, wherein said adaptive control means selects the wireless communication network based on the quality of the radio transmission link connecting said frequency agile transceiver and the selected wireless communication network.

8. The multi-modal device as defined in claim 5, wherein said adaptive control means selects the wireless communication network based on the probability of being dropped from the network.

9. The multi-modal device as defined in claim 5, wherein said adaptive control means selects the wireless communication network based on the security of the radio transmission link connecting said frequency agile transceiver and the selected wireless communication network.

10. The multi-modal device as defined in claim 5, wherein said adaptive control means selects the wireless communication network based on prior experience with specific wireless communication networks.

11. The multi-modal device as defined in claim 5, wherein said adaptive control means selects the wireless communication network based on the combined determination of two or more of the following:
the cost of using the wireless communication network;
the quality of the transmission link connecting said frequency agile transceiver and the selected wireless communication network;
prior experience with specific wireless communication networks;
the potential for being dropped by the network; and
the security of the radio transmission link connecting said frequency agile transceiver and the selected wireless communication network.

12. The multi-modal device as defined in claim 5, wherein said adaptive control means is adapted to communicate in accordance with an electronic handshake with selected wireless communication networks to determine on a real time basis the cost for desired services and operating characteristics of the corresponding wireless communication network.

13. The multi-modal device as defined in claim 5, further including a modem means for modulating and/or demodulating a carrier signal with user data.

14. The multi-modal device as defined in claim 13, further including a data processor means for processing digital data sent and/or received over said frequency agile transceiver.

15. The multi-modal device as defined in claim 13, wherein said data processor means causes said protocol agile operating circuit means is adapted to cause said frequency agile transceiver to control telephone call placement and call answering functions over wireless communication networks having such telephone functions.

16. A method of using a frequency agile radio transceiver for facilitating wireless communication over any one of a plurality of wireless communication networks operating pursuant to differing transmission protocols and/or over differing radio frequencies, comprising the steps of:

operating a frequency agile radio transceiver at a radio frequency appropriate for each of the plurality of wireless communication networks as determined by a frequency control signal;

interconnecting said frequency agile radio transceiver with a device to allow information to be transferred between said device and a remote device over said frequency agile radio transceiver;

operating said frequency agile radio transceiver and said interconnecting device in accordance with one of the transmission protocols as determined by a protocol control signal;

accessing a selected wireless communication network by generating the frequency control signal and the protocol control signal in response to a user defined criteria to cause the device to communicate with the selected wireless communication network using the frequency determined by the frequency control signal and the protocol determined by the protocol control signal.

17. The method as defined in claim 16, wherein said step of selecting the wireless communication network is based on the least cost.

18. The method as defined in claim 16, wherein said step of selecting the wireless communication network is based on the quality of the radio transmission link connecting said frequency agile transceiver and the selected wireless communication network.

19. The method of claim 16 wherein said step of selecting the wireless communication network is based on the potential for being dropped by the network.

20. The method of claim 16, wherein said step of selecting the wireless communication network is based on the security of the radio transmission link connecting said frequency agile transceiver and the selected wireless communication network.

21. The method of claim 16, wherein said step of selecting the wireless communication network is based on prior experience with specific wireless communication networks.

22. The method of claim 16, wherein said step of selecting the wireless communication network is based on the combined determination of two or more of the following:

the cost of using the wireless communication network;

the quality of the transmission link connecting said frequency agile transceiver and the selected wireless communication network;

prior experience with specific wireless communication networks;

the potential for being dropped from the network; and the security of the radio transmission link connecting said frequency agile transceiver and the selected wireless communication network.

23. The method of claim 16 further including the step of engaging in an electronic handshake with selected wireless communication networks to determine on a real time basis the cost for desired services and the operating characteristics of the corresponding wireless communication network.

24. The method of claim 16, further including the step of causing said frequency agile transceiver to control telephone call placement and call answering functions over wireless communication networks having such telephone functions.

* * * * *